United States Patent
Mo et al.

(10) Patent No.: US 9,773,148 B2
(45) Date of Patent: Sep. 26, 2017

(54) DISPLAY DEVICE, DRIVING CIRCUIT, METHOD FOR DRIVING DISPLAY DEVICE, AND ELECTRONIC APPARATUS

(71) Applicant: FocalTech Systems, Ltd., George Town, Grand Cayman (KY)

(72) Inventors: Lianghua Mo, Guangdong (CN); Junqiao Liu, Guangdong (CN); Haijun Hu, Guangdung (CN); Jie Liu, Guangdong (CN)

(73) Assignee: FOCALTECH ELECTRONICS, LTD., Grand Cayman (KY)

( * ) Notice: Subject to any disclaimer, the term of this patent is extended or adjusted under 35 U.S.C. 154(b) by 72 days.

(21) Appl. No.: 14/586,063

(22) Filed: Dec. 30, 2014

(65) Prior Publication Data
US 2015/0254491 A1  Sep. 10, 2015

(30) Foreign Application Priority Data

Mar. 7, 2014 (CN) .......................... 2014 1 0084293

(51) Int. Cl.
G06K 9/00 (2006.01)
G06F 3/041 (2006.01)
G06F 3/044 (2006.01)

(52) U.S. Cl.
CPC .......... *G06K 9/0002* (2013.01); *G06F 3/044* (2013.01); *G06F 3/0412* (2013.01); *G06F 3/0416* (2013.01)

(58) Field of Classification Search
None
See application file for complete search history.

(56) References Cited

U.S. PATENT DOCUMENTS 6,327,376 B1  12/2001  Harkin
6,411,727 B1  6/2002  Harkin
(Continued)

FOREIGN PATENT DOCUMENTS

CN   102768604   11/2012
TW    397918    7/2000
(Continued)

OTHER PUBLICATIONS

104107340, May 12, 2016, Taiwanese 1st Office Action with English Summary.
201410084293.6, dated Jun. 9, 2017, CN, Office Action.

*Primary Examiner* — Nicholas Lee
*Assistant Examiner* — Benjamin Casarez
(74) *Attorney, Agent, or Firm* — Workman Nydegger

(57) ABSTRACT

A display device is provided. The display device includes: a display panel provided with a plurality of display electrodes, where the display electrodes are configured for displaying images, display electrodes located within a predetermined region of the display panel are defined as first electrodes, the first electrodes are configured for fingerprint sensing, and a stage during which the first electrodes perform the fingerprint sensing is defined as a fingerprint sensing stage; and a driving circuit configured to, provide display signals to the display electrodes to display the images, and provide a fingerprint sensing signal to the first electrodes during the fingerprint sensing stage and perform a self-capacitance detection on the first electrodes, to implement the fingerprint sensing. A driving circuit, a method for driving the display device, a liquid crystal display device and an electronic apparatus including the display device are provided.

79 Claims, 16 Drawing Sheets

(56) References Cited

U.S. PATENT DOCUMENTS

| | | | |
|---|---|---|---|
| 2003/0020495 A1* | 1/2003 | Andrade | G01D 5/24 324/686 |
| 2007/0031012 A1 | 2/2007 | Sheu et al. | |
| 2007/0216657 A1* | 9/2007 | Konicek | G06F 3/0412 345/173 |
| 2007/0272020 A1* | 11/2007 | Schneider | G01N 29/06 73/628 |
| 2008/0157787 A1* | 7/2008 | Misra | G06K 9/0002 324/686 |
| 2010/0098303 A1* | 4/2010 | Chen | G06K 9/0002 382/124 |
| 2011/0096023 A1* | 4/2011 | Shih | G06F 3/0412 345/174 |
| 2011/0102567 A1 | 5/2011 | Erhart | |
| 2012/0242635 A1* | 9/2012 | Erhart | G06F 1/1626 345/207 |
| 2013/0263252 A1* | 10/2013 | Lien | G06F 21/32 726/19 |
| 2014/0104228 A1* | 4/2014 | Chen | G06F 3/044 345/174 |
| 2014/0111471 A1 | 4/2014 | Zhao | |
| 2014/0167332 A1 | 6/2014 | Miyazaki et al. | |
| 2014/0218327 A1* | 8/2014 | Shi | G06F 3/041 345/174 |
| 2014/0320444 A1* | 10/2014 | Chen | G06F 3/044 345/174 |
| 2014/0333328 A1* | 11/2014 | Nelson | G06F 3/044 324/663 |
| 2014/0362026 A1* | 12/2014 | Chen | G06F 3/044 345/174 |
| 2015/0022670 A1* | 1/2015 | Gozzini | G06K 9/0002 348/187 |
| 2015/0030217 A1* | 1/2015 | Wickboldt | G06K 9/00026 382/124 |
| 2015/0109214 A1* | 4/2015 | Shi | G06F 3/044 345/173 |
| 2015/0116263 A1* | 4/2015 | Kim | G06F 3/044 345/174 |
| 2015/0177884 A1* | 6/2015 | Han | G06F 3/044 345/174 |
| 2015/0242673 A1* | 8/2015 | Singhal | G06K 9/00013 345/174 |
| 2016/0042215 A1* | 2/2016 | Wang | G06K 9/0002 382/124 |

FOREIGN PATENT DOCUMENTS

| | | |
|---|---|---|
| TW | 424207 | 3/2001 |
| TW | I315852 | 10/2009 |
| TW | M517829 | 2/2016 |

* cited by examiner

US 9,773,148 B2

DISPLAY DEVICE, DRIVING CIRCUIT, METHOD FOR DRIVING DISPLAY DEVICE, AND ELECTRONIC APPARATUS

CROSS REFERENCES OF RELATED APPLICATION

The present application claims the priority to Chinese Patent Application No. 201410084293.6, entitled "DISPLAY DEVICE, DRIVING CIRCUIT, METHOD FOR DRIVING DISPLAY DEVICE, AND ELECTRONIC APPARATUS", filed on Mar. 7, 2014 with the State Intellectual Property Office of People's Republic of China, which is incorporated herein by reference in its entirety.

FIELD

The disclosure relates to the field of flat panel display, and particularly to a display device, a driving circuit, a method for driving the display device, a liquid crystal display device and an electronic apparatus.

BACKGROUND

The population of smart phones, tablet computers and other electronic apparatuses influences lifestyles of people. As various payment clients and other applications being applied in use, how to improve the security and privacy of the electronic apparatus becomes a hot issue concerned by the technologists.

FIG. 1 is a schematic diagram of a conventional electronic apparatus with a fingerprint recognition function. The electronic apparatus 1 is provided with a fingerprint sensing device 2 capable of implementing fingerprint recognition. The fingerprint sensing device 2 may perform the fingerprint recognition for a user of the electronic apparatus 1, and a fingerprint image may be used as a key for turning on the electronic apparatus or a key for a payment client, thereby improving the security in using the electronic apparatus.

As shown in FIG. 1, the fingerprint sensing device 2 is an independent sensing device and is placed outside a display region 3 of the electronic apparatus 1.

The fingerprint sensing device 2 results in an increase of the size of the electronic apparatus 1, which does not satisfy requirements for lightness and thinness. Moreover, since the fingerprint sensing device 2 is an independent electronic device, the cost is high, the production process is complicated and it is inconvenient to be integrated.

SUMMARY

A display device, a driving circuit, a method for driving the display device and a liquid crystal display device are provided according to the disclosure, to improve the integration level of the display device.

For solving the technical problems described in background, a display device is provided according to the disclosure. The display device includes: a display panel provided with a plurality of display electrodes, where the display electrodes are configured to display images, the display electrodes located within a predetermined region of the display panel are defined as first electrodes, the first electrodes are configured for a fingerprint sensing, and a stage during which the first electrodes perform the fingerprint sensing is defined as a fingerprint sensing stage; and a driving circuit configured to provide display signals to the display electrodes to implement the image display, and provide a fingerprint sensing signal to the first electrodes and perform a self-capacitance detection on the first electrodes during the fingerprint sensing stage, to implement the fingerprint sensing.

Correspondingly, a display device is further provided according to the disclosure. The display device includes: a display panel provided with first electrodes located within a predetermined region of the display panel and second electrodes located outside the predetermined region; and a driving circuit configured to provide a fingerprint sensing signal to the first electrodes and perform a self-capacitance detection on the first electrodes to implement a fingerprint sensing, and provide display signals to the second electrodes to display images.

Correspondingly, a driving circuit for a display device is further provided according to the disclosure. The display device includes a display panel provided with a plurality of display electrodes, the display electrodes are configured to display images, the display electrodes located within a predetermined region of the display panel are defined as first electrodes, the first electrodes are configured to implement a fingerprint sensing, and a stage during which the first electrodes perform the fingerprint sensing is defined as a fingerprint sensing stage. The driving circuit includes: a display driving unit configured to provide display signals to the display electrodes, to implement the image display; a fingerprint sensing unit configured to provide a fingerprint sensing signal to the first electrodes and perform a self-capacitance detection on the first electrodes, to implement the fingerprint sensing; and a control unit configured to control the fingerprint sensing unit to provide the fingerprint sensing signal to the first electrodes during the fingerprint sensing stage, to perform the fingerprint sensing.

Correspondingly, a method for driving a display device is further provided according to the disclosure. The display device includes a display panel provided with a plurality of display electrodes, the display electrodes are configured to display images, the display electrodes located within a predetermined region of the display panel are defined as first electrodes, the first electrodes are configured to implement a fingerprint sensing, and a stage during which the first electrodes perform the fingerprint sensing is defined as a fingerprint sensing stage. The method includes: providing display signals to the display electrodes to display the images; and providing a fingerprint sensing signal to the first electrodes and performing a self-capacitance detection on the first electrodes during the fingerprint sensing stage.

Correspondingly, a liquid crystal display device is further provided according to the disclosure. The liquid crystal display device includes: a display panel provided with a plurality of display electrodes, where the display electrodes are configured to display images, the display electrodes located within a predetermined region of the display panel are defined as first electrodes, the first electrodes are configured to implement a fingerprint sensing, and a stage during which the first electrodes perform the fingerprint sensing is defined as a fingerprint sensing stage; and a driving circuit configured to provide display signals to the display electrodes to display the images, and provide a fingerprint sensing signal to the first electrodes and perform a self-capacitance detection on the first electrodes during the fingerprint sensing stage to implement the fingerprint sensing.

Correspondingly, a liquid crystal display device is further provided according to the disclosure. The liquid crystal display device includes: a display panel provided with first electrodes located within a predetermined region of the display panel and second electrodes located outside the predetermined region; and a driving circuit configured to provide a fingerprint sensing signal to the first electrodes and perform a self-capacitance detection on the first electrodes, to implement a fingerprint sensing, and provide display signals to the second electrodes to display images.

Correspondingly, a display device configured to implement image display and fingerprint sensing is further provided according to the disclosure. The display device includes a display panel including a plurality of pixel units, each pixel unit includes one display electrode, the pixel units located within a predetermined region of the display panel are defined as first pixel units, and the display electrodes of the first pixel units are defined as first electrodes; and a data line driving circuit connected with the pixel units and configured to provide display signals to the display electrodes of the pixel units to implement the image display. The display device further includes: a fingerprint sensing detection unit connected with the first pixel units and configured to provide a fingerprint sensing signal to the first electrodes of the first pixel units, to implement the fingerprint sensing by detecting self-capacitances of the first electrodes; and a control unit configured to control whether the data line driving circuit provides the display signals to the plurality of pixel units and control whether the fingerprint sensing detection unit drives the first electrodes of the first pixel units to perform the fingerprint sensing. Under the control of the control unit, if the fingerprint sensing detection unit drives the first electrodes of the first pixel units to perform the fingerprint sensing, the data line driving circuit is disconnected from the first pixel units or the data line driving circuit stops outputting the display signals to the first electrodes of the first pixel units.

Correspondingly, a display device is further provided according to the disclosure. The display device includes: a display panel including a plurality of pixel units and a plurality of data lines connected with the pixel units, where each pixel unit includes one display electrode, the display electrodes are configured to display images, the pixel units located within a predetermined region of the display panel are defined as first pixel units, the display electrodes of the first pixel units are defined as first electrodes, and the first electrodes are configured to implement a fingerprint sensing; and a data line driving circuit connected with the pixel units via the data lines, where the data line driving circuit is configured to provide display signals to the display electrodes of the pixel units via the data lines to implement image display. The display panel further includes transmission lines, and the display device further includes: a fingerprint sensing detection unit connected with the first pixel units via the transmission lines, the fingerprint sensing detection unit is configured to provide a fingerprint sensing signal to the first electrodes of the first pixel units via the transmission lines, to implement the fingerprint sensing by detecting the self-capacitances of the first electrodes; and a control unit configured to control the first electrodes to perform the fingerprint sensing or the image display.

In addition to the image display, the display device according to the disclosure can also implement the fingerprint sensing at the predetermined region, that is, the display device according to the disclosure is integrated with a fingerprint sensing function, thereby leading to a higher integration level. For an electronic apparatus including the display device, there is no need to provide a separate fingerprint sensing device, thereby reducing the size and weight of the electronic apparatus and lowering the cost.

The display device according to the disclosure can not only implement the fingerprint sensing at the predetermined region and the image display, but also can implement the touch detection, thereby further improving the integration level of the display device, reducing the size and weight of the display device and lowering the cost.

The electronic apparatus according to the disclosure can implement the image display and the fingerprint sensing. The electronic apparatus has good security, high integration level, and small size and light weight.

DETAILED DESCRIPTION

To make the above objects, features and advantages of the disclosure more obvious and easy to be understood, in the following, particular embodiments of the disclosure are illustrated in detail in conjunction with drawings.

Figure 1:
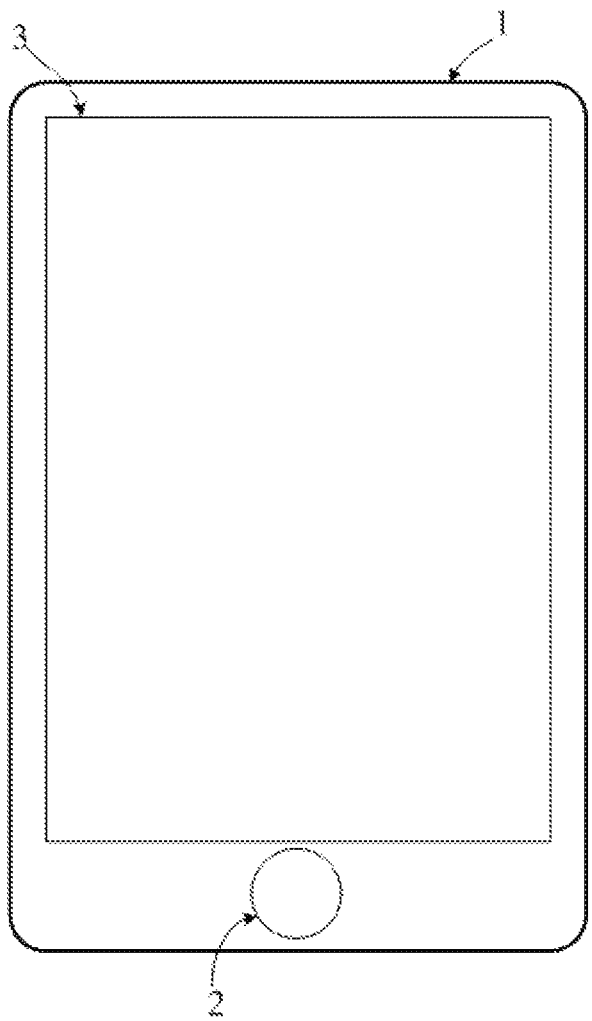
FIG. 1 is a schematic diagram of a conventional electronic apparatus with a fingerprint recognition function.
Figure 2:
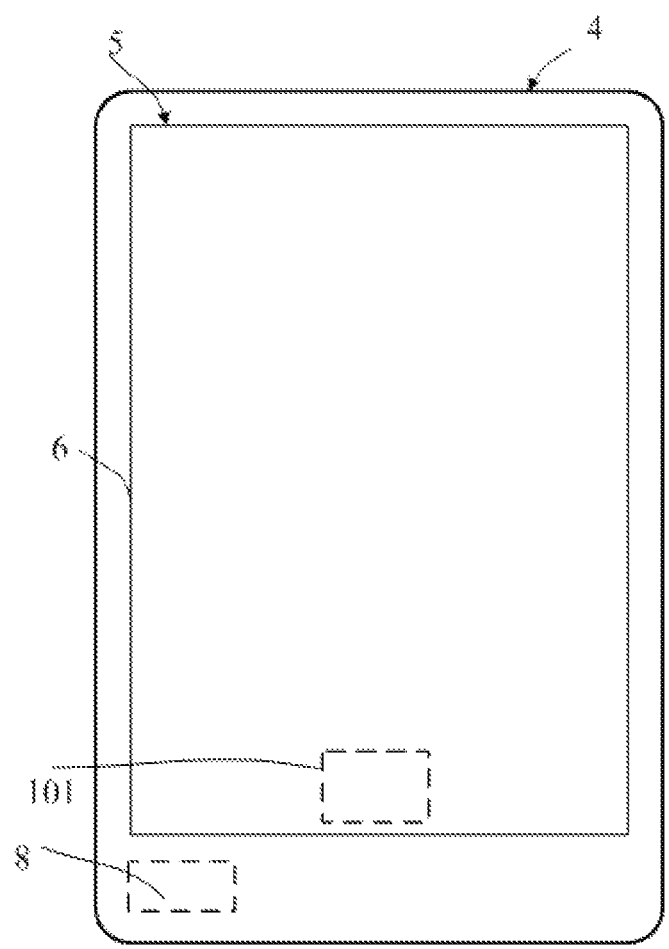
FIG. 2 is a schematic diagram of an electronic apparatus according to an embodiment of the disclosure.

For solving the problems mentioned in the background, an electronic apparatus is provided according to the disclosure. As shown in FIG. 2, which is a schematic diagram of an electronic apparatus according to an embodiment of the disclosure, the electronic apparatus 4 includes a display device 5 having a display region 6, the display region 6 is configured to display an image, and a predetermined region

101 within the display region 6 may be configured to implement fingerprint sensing.

A fingerprint sensing instruction unit 8 may be provided in the electronic apparatus 4. The fingerprint sensing instruction unit 8 is connected with the display device 5 in a wired way or in a wireless way, and is configured to trigger the display device 5 to perform the fingerprint sensing.

It should be noted that, the fingerprint sensing instruction unit 8 is represented with a dashed box in FIG. 2, which schematically indicates that the electronic apparatus 4 may include the fingerprint sensing instruction unit 8. The position and formation of the fingerprint sensing instruction unit 8 should not be limited by the dashed box.

For example, the electronic apparatus 4 is provided with a turning-on device configured to turn on the electronic apparatus 4. The turning-on device may include the fingerprint sensing instruction unit 8 configured to trigger, in turning on the electronic apparatus 4, the display device 5 to perform the fingerprint sensing.

Alternatively, the electronic apparatus 4 is provided with an application device configured to provide an application. The application device may include the fingerprint sensing instruction unit 8 configured to trigger, once the application is selected or in using the application, the display device 5 to perform the fingerprint sensing.

Alternatively, the electronic apparatus 4 is provided with a touch detection device configured to perform a touch detection. The touch detection device may include the fingerprint sensing instruction unit 8 configured to trigger, when a user touches the predetermined region 101, the display device 5 to perform the fingerprint sensing.

Optionally, the fingerprint sensing instruction unit 8 is disposed in any one or any combination of the turning-on device, the application device and the touch detection device. Hence, the user of the electronic apparatus 4 may have many choices about arrangement of the fingerprint sensing instruction unit 8, and the security of the electronic apparatus 4 is further improved.

It should be noted that, whether any fingerprint sensing instruction unit 8 is provided in the electronic apparatus 4 is not limited in the disclosure. In other embodiments, other ways or means may be adopted to trigger the display device 5 to perform the fingerprint sensing.

Specifically, the electronic apparatus 4 may be a mobile phone, a tablet computer, a notebook computer, or a desktop computer, which is not limited in the disclosure.

Figure 3:
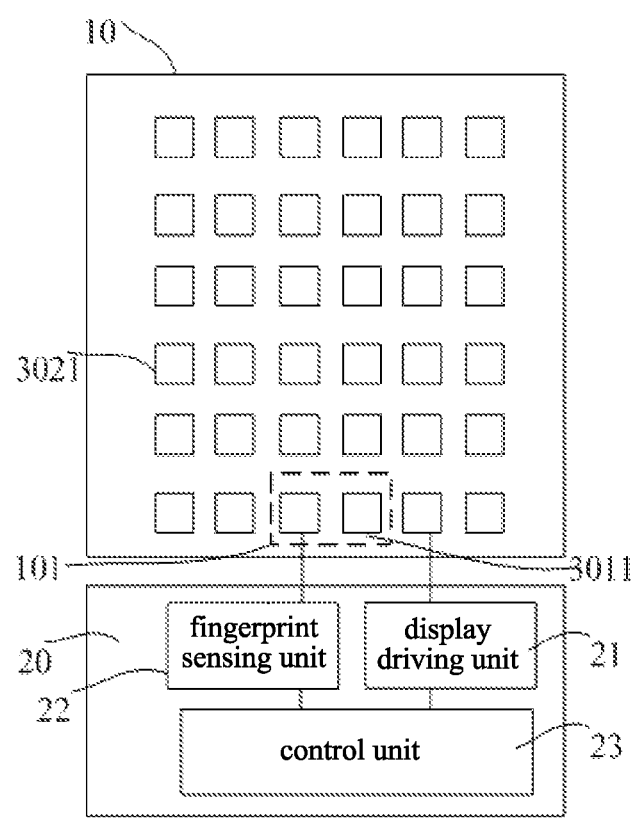
FIG. 3 is a functional block diagram of a display device according to an embodiment of the disclosure.

As shown in FIG. 3, which is a functional block diagram of a display device according to an embodiment of the disclosure, the display device 5 includes a display panel 10 and a driving circuit 20. The driving circuit 20 is connected with the display panel 10.

The display panel 10 includes a plurality of display electrodes 300 for displaying images. The display electrodes 300 located at the predetermined region 101 of the display panel 10 are defined as first electrodes 3011, the first electrodes 3011 are further configured for fingerprint sensing, and a stage during which the first electrodes 3011 perform the fingerprint sensing is defined as a fingerprint sensing stage.

The driving circuit 20 is configured to provide display signals to the display electrodes 300 to display the images. The driving circuit 20 is further configured to provide a fingerprint sensing signal to the first electrodes 3011 and perform a self-capacitance detection on the first electrodes 3011 during the fingerprint sensing stage, to implement the fingerprint sensing. For example, each first electrode 3011 forms a self-capacitor. When a finger touches or locates near the first electrode 3011, the electric field near the first electrode 3011 alters, and consequently, the self-capacitance of the first electrode 3011 alters. The self-capacitance detection is to detect changes of the self-capacitances of the first electrodes caused by the fingerprint input.

In addition to the image display, the display device according to the disclosure can also implement the fingerprint sensing at the predetermined region 101, that is, the display device according to the disclosure is integrated with a fingerprint sensing function, thereby leading to a higher integration level. For an electronic apparatus including the display device, there is no need to provide a separate fingerprint sensing device, thereby reducing the size and weight of the electronic apparatus and further lowering the cost of the electronic apparatus.

Specifically, it is illustrated by taking a case that the electronic apparatus 4 is a mobile phone as an example. During turning on the mobile phone, the fingerprint sensing stage is triggered, and the driving circuit 20 provides the fingerprint sensing signal to the first electrodes 3011 and performs the self-capacitance detection on the first electrodes 3011, to implement the fingerprint sensing. A user of the mobile phone touches the predetermined region 101 with a finger to perform the fingerprint sensing. The mobile phone may be successfully turned on if a fingerprint of the user of the mobile phone acquired through the fingerprint sensing matches fingerprint information stored in the mobile phone, or the mobile phone may not be successfully turned on if the fingerprint of the user of the mobile phone acquired through the fingerprint sensing does not match the fingerprint information stored in the mobile phone, thereby preventing information leakage of the mobile phone and improving the security for usage of the mobile phone.

It should be noted that, in addition to being triggered during turning on the mobile phone, the fingerprint sensing stage may also be triggered by a fingerprint sensing instruction.

It is also illustrated by taking the case that the electronic apparatus 4 is a mobile phone as an example. In a case that the user of the mobile phone makes a payment with a third-party payment client, a fingerprint sensing instruction is sent to the driving circuit 20 when an application (APP) of the third-party payment client is clicked, to trigger the fingerprint sensing stage. For another example, in a case that the mobile phone is in a screen-locked state and there is a need to unlock the mobile phone, a fingerprint sensing instruction is sent to the driving circuit 20 due to triggering of a touch detection or a control button, the fingerprint sensing stage is triggered, and the mobile phone may be unlocked with the fingerprint.

It should be noted that, the driving circuit 20 provides the display signals to the display electrodes 300 (including the first electrodes 3011) before the fingerprint sensing stage, to implement the image display. The fingerprint sensing stage is triggered in the case that the driving circuit 20 receives the fingerprint sensing instruction (or the fingerprint sensing stage may be triggered in other ways). In the fingerprint sensing stage, the driving circuit 20 provides the fingerprint sensing signal instead of the display signals and performs the self-capacitance detection on the first electrodes 3011, to implement the fingerprint sensing.

The user of the mobile phone touches the predetermined region 101 with a finger to perform the fingerprint sensing. The third-party payment client can be successfully started and the user can make the payment if the fingerprint of the user of the mobile phone acquired during the fingerprint sensing stage matches the fingerprint information stored in the mobile phone. Or the third-party client can not be successfully opened if the fingerprint of the user of the mobile phone acquired during the fingerprint sensing stage does not match the fingerprint information stored in the mobile phone. Therefore, the security of mobile phone payment may be improved.

Specifically, as shown in FIG. 3, the driving circuit 20 includes a display driving unit 21, a fingerprint sensing unit 22 and a control unit 23. The display driving unit 21 is configured to provide the display signals to the display electrodes 300 to implement the image display. The fingerprint sensing unit 22 is configured to provide the fingerprint sensing signal to the first electrodes 3011 and perform the self-capacitance detection on the first electrodes 3011, to implement the fingerprint sensing. The control unit 23 is configured to control the fingerprint sensing unit 22 to provide the fingerprint sensing signal to the first electrodes 3011 during the fingerprint sensing stage to perform the fingerprint sensing on the first electrodes 3011.

It is illustrated by taking the case that the electronic apparatus 4 is a mobile phone as an example. The turning-on device of the mobile phone is connected with the control unit 23. The user triggers the control unit 23 when turning on the mobile phone through the turning-on device, to trigger the fingerprint sensing stage. The control unit 23 controls the fingerprint sensing unit 22 to provide the fingerprint sensing signal to the first electrodes 3011, to perform the fingerprint sensing.

Alternatively, in using the mobile phone, the control unit 23 controls the display driving unit 21 to provide the display signals to the display electrodes 300, to implement image display on a whole display panel of the mobile phone. The fingerprint sensing instruction is sent to the control unit 23 when the user clicks the APP of the third-party payment client, to trigger the fingerprint sensing stage. The control unit 23 receives the fingerprint sensing instruction, switches a signal provided to the first electrodes 3011 from the display signals to the fingerprint sensing signal, and performs the self-capacitance detection on the first electrodes 3011, to implement the fingerprint sensing. Specifically, the control unit 23 may control the display driving unit 21 not to provide the display signals to the first electrodes 3011, and may control the fingerprint sensing unit to provide the fingerprint sensing signal to the first electrodes 3011.

Figure 4:
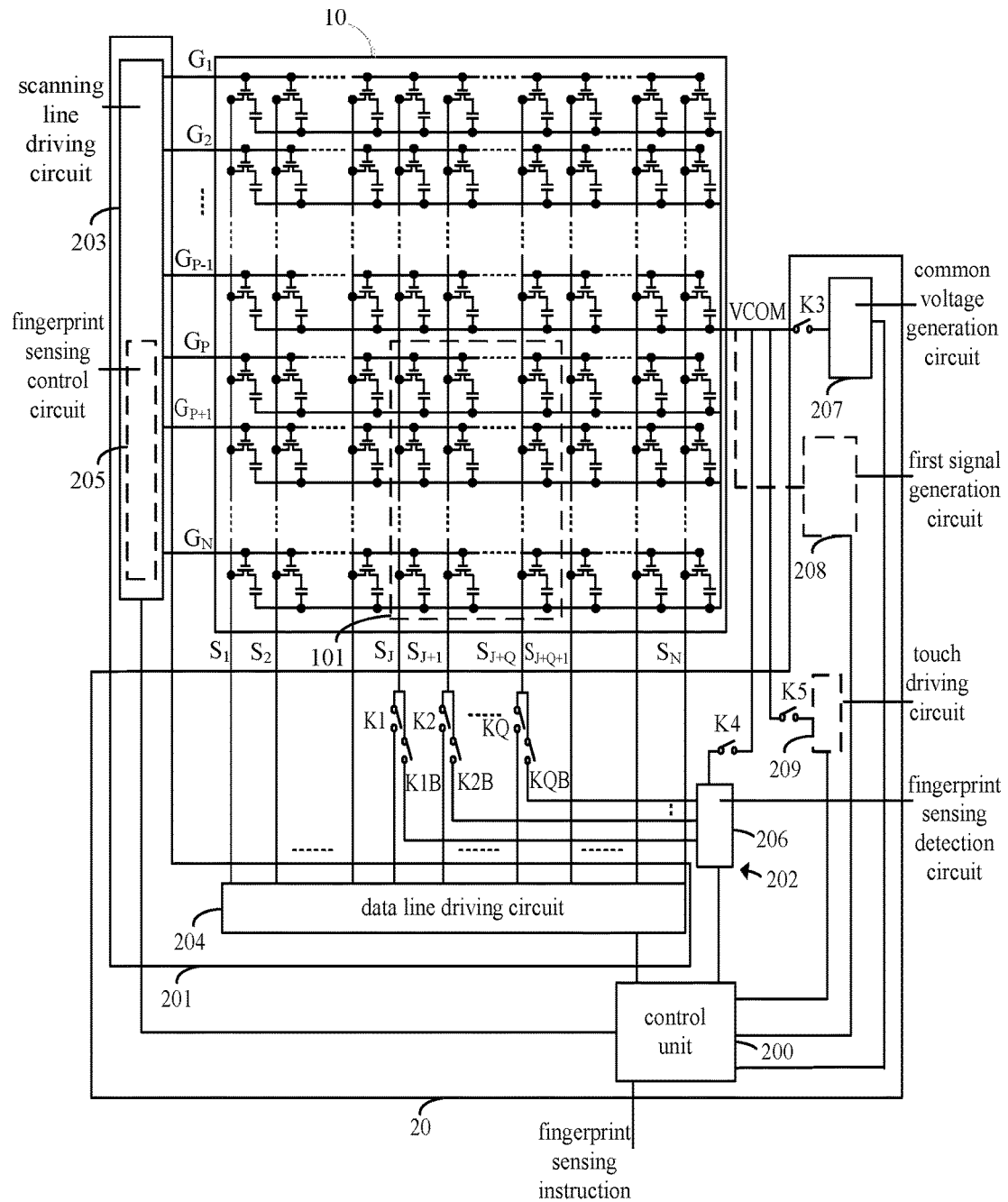
FIG. 4 is a schematic structural diagram of the display device shown in FIG. 3.
Figure 5:
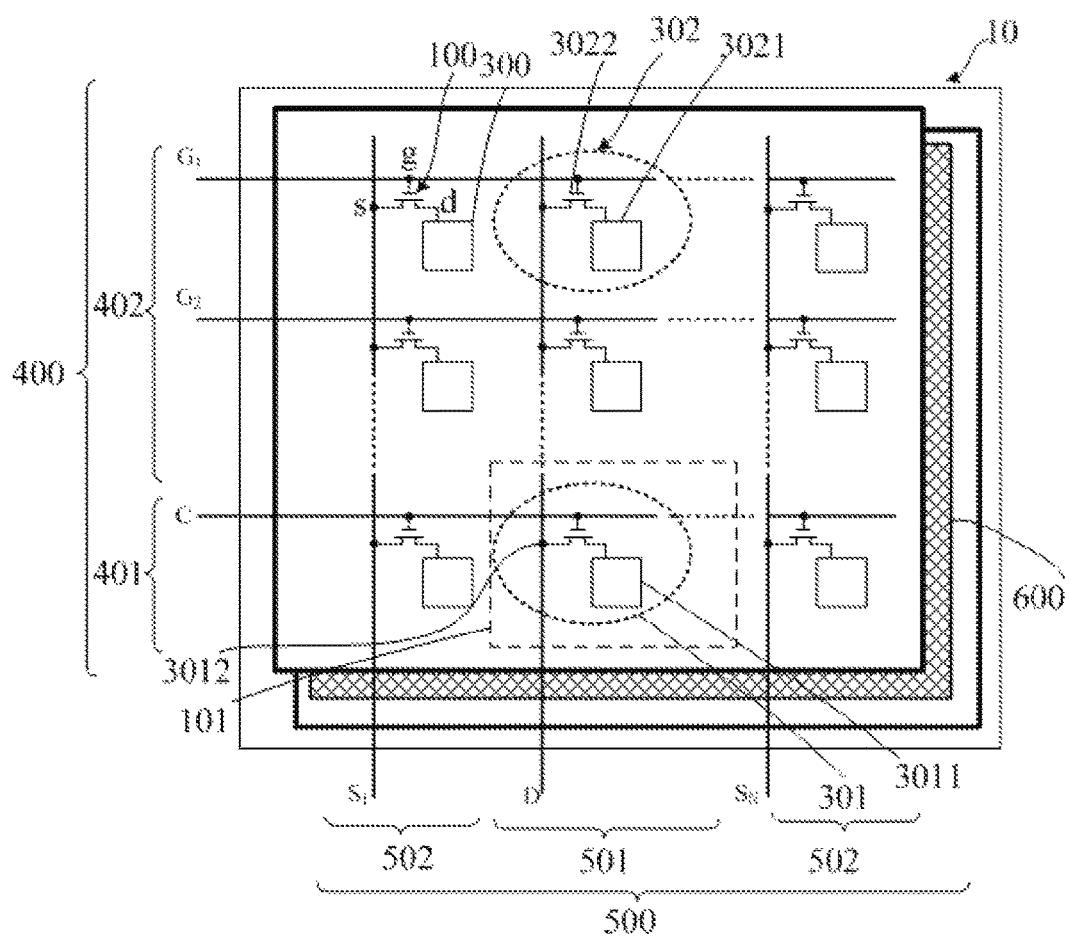
FIG. 5 is a schematic structural diagram of a display panel in FIG. 4.
Figure 6:
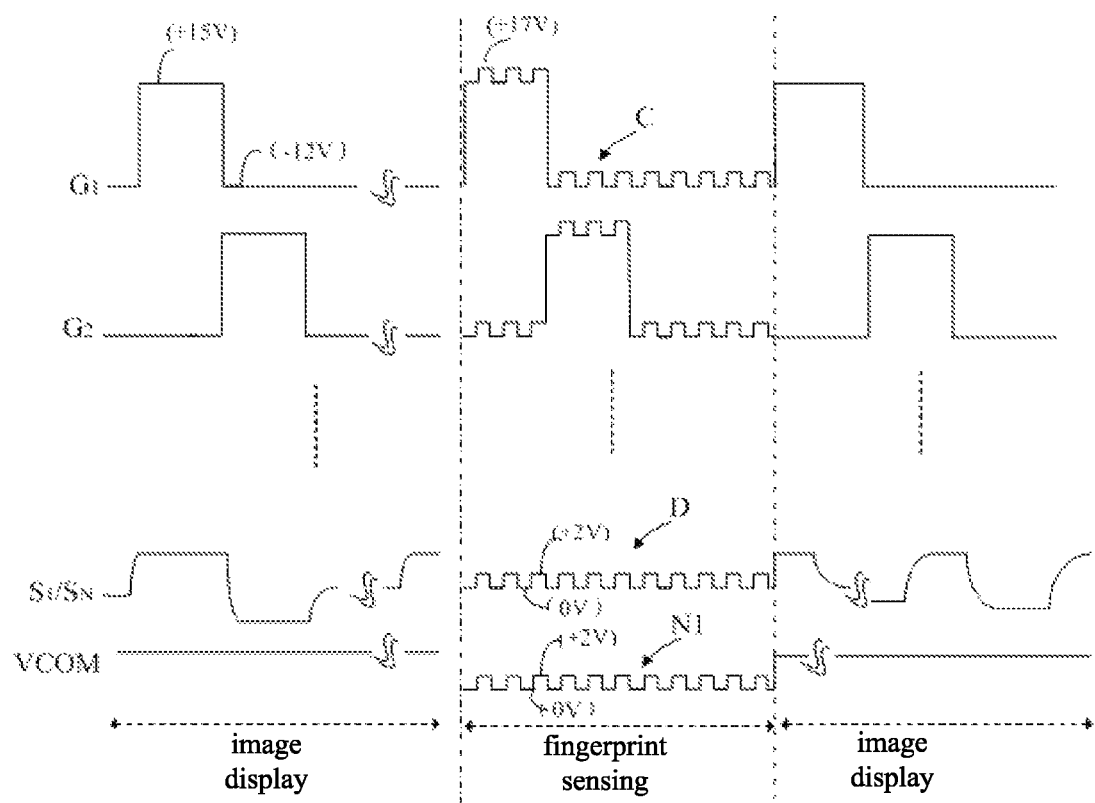
FIG. 6 is a schematic diagram showing signals of a driving circuit in FIG. 4.

FIG. 4 is a schematic structural diagram of the display device 5 shown in FIG. 3, FIG. 5 is a schematic structural diagram of the display panel 10 of the display device 5 shown in FIG. 3, and FIG. 6 is a schematic diagram showing signals of the driving circuit 20 shown in FIG. 3. It should be noted that, it is illustrated here by taking a case that the display device 5 is a liquid crystal display device as an example, and correspondingly, a display medium is liquid crystal. However, whether the display device is a liquid crystal display device is not limited in the disclosure, and the display device 5 may also be any appropriate types of display device in other embodiments. In the embodiment, the display device 5 includes the display panel 10 and the driving circuit 20.

In the display device 5 according to the embodiment, the display panel 10 is further provided with scanning lines 400 arranged in rows, data lines 500 arranged in columns, and control switches 100 connected with the scanning lines 400 and the data lines 500. Each control switch 100 includes a control terminal g, a first terminal s and a second terminal d. The control terminal g is configured to control whether a signal can be transmittable between the first terminal s and the second terminal d. The control terminals g of the control switches 100 are connected with the scanning lines 400, the first terminals s are connected with the data lines 500, and the second terminals d are correspondingly connected with the display electrodes 300 (as shown in FIG. 5).

Specifically, the control switch 100 may be a thin film transistor (TFT), and the TFT is an amorphous-silicon TFT or a poly-silicon TFT. The control switch 100 may be a control switch in other structures.

In the display device 5 according to the embodiment, the display driving unit 21 includes a scanning line driving circuit 203 connected with the scanning lines 400 and configured to send scanning driving signals $G_1, G_2 \ldots G_N$ to the scanning lines 400 to switch on the control switches 100, and a data line driving circuit 204 connected with the data lines 500 and configured to send display signals $S_1 \ldots S_N$ to the data lines 500. The display signals $S_1 \ldots S_N$ are transmitted to the display electrodes 300 through the control switches 100 which are switched on (as shown in FIG. 4).

It should be noted that, a gate-in-panel (GIP) technique is adopted for the liquid crystal display panel in FIG. 4, and the scanning line driving circuit 203 is disposed on the display panel 10. However, it is not limited thereto in the disclosure, and the scanning line driving circuit 203 may be integrated into the driving circuit 20 rather than disposed on or integrated in the display panel 10.

As shown in FIG. 5, the display panel 10 includes a plurality of sub-pixel units, the display electrodes 300 are pixel electrodes. A common electrode 600 is further provided on the display panel 10 and is arranged opposite to the pixel electrodes. The common electrode 600 and each display electrode (specifically the pixel electrode) serve as two polar plates of one sub-pixel unit in the display panel 10. The display signals $S_1 \ldots S_N$ are pixel voltages, and a common voltage VCOM is applied to the common electrode 600. Deflections of liquid crystal molecules in the sub-pixel unit are determined by the pixel voltage and the common voltage VCOM on the sub-pixel unit, thereby determining the light transmittance of the sub-pixel unit, and the image display is implemented in combination with the color of a color filter (not shown).

Specifically, each sub-pixel unit includes one display electrode 300 and the control switch 100 connected with the display electrode 300. The sub-pixel units including the first electrodes 3011 are defined as first sub-pixel units 301, and other sub-pixel units are defined as second sub-pixel units 302. The control switch 100 in each first sub-pixel unit 301 is defined as a first control switch 3012. The display electrode 300 in each second sub-pixel unit 302 is defined as a second electrode 3021, and the control switch 100 in each second sub-pixel unit 302 is defined as a second control switch 3022. The scanning lines 400 connected with the first sub-pixel units 301 are defined as first scanning lines 401, and the scanning lines connected with the second sub-pixel units 302 but not connected with the first sub-pixel units 301 are defined as second scanning lines 402. The data lines 500 connected with the first sub-pixel units 301 are defined as first data lines 501, and the data lines 500 connected with the second sub-pixel units 302 but not connected with the first sub-pixel units 301 are defined as second data lines 502.

In the driving circuit 20, a fingerprint sensing unit 202 includes a fingerprint sensing control circuit 205 and a fingerprint sensing detection circuit 206. The fingerprint sensing control circuit 205 is connected with the first scanning lines 401, and is configured to provide a fingerprint sensing control signal C to switch on the first control switches 3012.

The fingerprint sensing detection circuit 206 is connected with the first data lines 501, and is configured to provide a fingerprint sensing signal D for performing the self-capacitance detection. The fingerprint sensing signal D is transmitted to the first electrodes 3011 through the first control switches 3012 which are switched on, to perform the fingerprint sensing on the first electrodes 3011.

During the fingerprint sensing stage, the control unit 23 may control the fingerprint sensing control circuit 205 to send the fingerprint sensing control signal C to the first scanning lines 401 to switch on the first control switches 3012, and may control the fingerprint sensing detection circuit 206 to send the fingerprint sensing signal D to the first data lines 501 to implement the fingerprint sensing through the first electrodes 3011 within the predetermined region 101.

Specifically, the first electrodes within the predetermined region 101 function as the display electrodes during the image display, and function as self-capacitance detection electrodes during the fingerprint sensing stage. A stage during which the first electrodes perform the image display is defined as an image display stage. As shown in FIGS. 4 and 5, fourth switches K1, K2 . . . KQ are respectively provided between the first data lines 501 and the data line driving circuit 204, and fifth switches K1B, K2B . . . KQB are respectively provided between the first data lines 501 and the fingerprint sensing detection circuit 206. The control unit 23 may achieve a switch between the image display stage and the fingerprint sensing stage by controlling the fourth switches K1, K2 . . . KQ and the fifth switches K1B, K2B . . . KQB.

Specifically, the control unit 23 is configured to, during the image display stage, control the fourth switches K1, K2 . . . KQ to be switched on and the fifth switches K1B, K2B . . . KQB to be switched off, and accordingly, the data line driving circuit 204 and the first data lines 501 are connected, and the data line driving circuit 204 provides the display signals to the first electrodes 3011 via the first data lines 501. It should be noted that, the data line driving circuit 204 may get disconnected from the first data lines 501 (more specifically, from the first sub-pixel units) by utilizing switches, but it is not limited thereto in the disclosure, and other ways may be adopted to achieve the disconnection between the data line driving circuit 204 and the first data lines 501 or stop the data line driving circuit to output the display signals to the first sub-pixel units.

The control unit 23 is further configured to, during the fingerprint sensing stage (for example, in a case that the fingerprint sensing instruction is received), control the fifth switches K1B, K2B . . . KQB to be switched on and the fourth switches K1, K2 . . . KQ to be switched off, and accordingly, the fingerprint sensing detection circuit 206 and the first data lines 501 are connected, and the fingerprint sensing detection circuit 206 provides the fingerprint sensing signal to the first electrodes 3011 via the first data lines 501, to perform the self-capacitance fingerprint sensing on the first electrodes 3011.

It should be noted that, it is illustrated herein by taking the case that both the data line driving circuit 204 and the fingerprint sensing detection circuit 206 provide signals to the first electrodes 3011 via identical first data lines 501 as an example. However, it is not limited thereto in the disclosure, and in other embodiments, the fingerprint sensing detection circuit 206 may provide the fingerprint sensing signal to the first electrodes 3011 via other transmission lines. The control unit 23 may control the first electrodes 3011 to perform the fingerprint sensing, thereby entering the fingerprint sensing stage, or the control unit 23 may control the first electrodes 3011 to perform the image display, thereby entering the image display stage.

As shown in FIG. 6, in the embodiment, the fingerprint sensing signal D is a square-wave pulse signal with a low level of 0V and a high level of 2V, and is configured for the self-capacitance detection of the first electrodes 3011 in the fingerprint sensing.

To reduce parasitic capacitances between the first electrodes 3011 and the first scanning lines 401, the fingerprint sensing control signal C is optionally a pulse signal having the same frequency, the same phase, and the same amplitude as the fingerprint sensing signal D. The fingerprint sensing control signal C is for switching on the first control switches 3012 during the fingerprint sensing and further reducing electric quantities in charging and discharging capacitors formed by the first scanning lines 401 and the first electrodes 3011.

Specifically, in the embodiment, the first control switches 3012 are N-type TFTs, with a cut-in voltage of 15V and a cut-off voltage of −12V.

As shown in FIG. 6, the fingerprint sensing control signal C has a high level region and a low level region. In the high level region, the fingerprint sensing control signal C is a pulse signal having a reference voltage equal to the cut-in voltage of 15V and an amplitude of 2V (i.e., a high level in the high level region is 17V). In this way, during the fingerprint sensing stage, with the high level region of the fingerprint sensing control signal C applied to the first scanning lines 401 having a low level of 15V and the high level of 17 V, the first control switches 3012 can be switched on. In addition, since the fingerprint sensing signal D applied to the first electrodes 3011 has the same frequency and the same phase as the fingerprint sensing control signal C, the electric quantities in charging and discharging the parasitic capacitors formed by the first electrodes 3011 and the first scanning lines 401 are reduced when compared with a case that no pulse signal having the same frequency and the same phase as the fingerprint sensing signal is transmitted via the first scanning lines 401, thereby making the parasitic capacitances between the first electrodes 3011 and the first scanning lines 401 have less affect on the fingerprint sensing.

Similarly, in the low level region, −12V is taken as a reference voltage and the amplitude is 2V (i.e., a high level in the low level region is −10V). For the N-type TFT, the cut-off voltage is generally −12V, and accordingly, the N-type TFT cuts off with a voltage of −10V. Therefore, the N-type TFT cuts off with the signal in the low level region, and the electric quantities in charging and discharging the parasitic capacitors formed by the first electrodes 3011 and the first scanning lines 401 are reduced.

It should be noted that, it is illustrated herein by taking the case that the fingerprint sensing control signal C is a pulse signal having the same frequency, the same phase and the same amplitude as the fingerprint sensing signal D as an example. However, it is not limited thereto in the disclosure. In other embodiments, if the fingerprint sensing control signal C is a pulse signal having the same frequency and the same phase as the fingerprint sensing signal D, the first control switches 3012 may also be switched on during the fingerprint sensing, and at the same time, the electric quantities in charging and discharging the capacitors formed by the first scanning lines 401 and the first electrodes 3011 may be reduced.

It should be noted that, as shown in FIG. 6, the fingerprint sensing control signal C is slightly different from the scanning driving signals $G_1, G_2 \ldots G_N$. Since the first electrodes 3011 are identical with other display electrodes 300 located outside the predetermined region 101, the first control switches 3012 are identical with the second control switches 3022, and the first scanning lines 401 are identical with the second scanning lines 402, the fingerprint sensing control circuit 205 may be integrated in the scanning line driving circuit 203 according to other embodiment (as shown in FIG. 4). Accordingly, the fingerprint sensing control signal C may be identical with the scanning driving signals $G_1, G_2 \ldots G_N$. For example, for the N-type TFT, both the fingerprint sensing control signal C and the scanning driving signals $G_1, G_2 \ldots G_N$ may be embodied as pulse signals with a high level of 15V and a low level of −12V.

As shown in FIGS. 4, 5 and 6, the driving circuit 20 further includes a common voltage generation circuit 207. The common voltage generation circuit 207 is connected with the common electrode 600, and is configured to provide the common voltage VCOM to the common electrode 600 during the image display stage. The two polar plates of the sub-pixel unit are applied with the common voltage and the pixel voltage respectively, to implement the image display.

The common electrode 600 is generally disposed opposite to the display electrodes 300, thereby easily resulting in parasitic capacitances. Optionally, the driving circuit 20 may further include a first signal generation circuit 208. The first signal generation circuit 208 is connected with the common electrode 600, and is configured to provide a first signal N1 for reducing the electric quantities in charging and discharging the capacitors formed by the first electrodes 3011 and the common electrodes 600 during the fingerprint sensing stage.

The control unit 23 is configured to, control the common voltage generation circuit 207 to provide the common voltage VCOM to the common electrode 600 during the image display stage. The control unit 23 is further configured to control the first signal generation circuit 208 to provide the first signal N1 to the common electrode 600 during the fingerprint sensing stage, thereby reducing the electric quantities in charging and discharging the capacitors formed by the first electrodes 3011 and the common electrode 600 during the fingerprint sensing.

Specifically, a switch may be provided between the first signal generation circuit 208 and the common electrode 600, and the control unit 23 controls the switch to control whether the first signal generation circuit 208 or the common voltage generation circuit 207 is connected with the common electrode 600.

As shown in FIG. 6, in the embodiment, the first signal N1 is identical with the fingerprint sensing signal D, and both of them are square-wave pulse signals with a low level of 0V and a high level of 2V. The potential difference between the common electrode applied with the first signal N1 and the first electrode 3011 applied with the fingerprint sensing signal D remains unchanged, and charging and discharging the capacitors formed by the first electrodes 3011 and the common electrode 600 substantially does not occur during the fingerprint sensing stage. However, whether the first signal N1 is identical with the fingerprint sensing signal D is not limited in the disclosure. In other embodiments, the first signal N1 may be a pulse signal having the same frequency and the same phase as the fingerprint sensing signal or a pulse signal having the same frequency, the same phase and the same amplitude as the fingerprint sensing signal, here the electric quantities in charging and discharging the capacitors formed by the first electrode 3011 and the common electrode 600 may also be reduced during the fingerprint sensing stage.

In the embodiment, since the first signal N1 is identical with the fingerprint sensing signal D, the first signal generation circuit 208 may be integrated in the fingerprint sensing detection circuit 206. In other words, during the fingerprint sensing stage, the fingerprint sensing detection circuit 206 sends the fingerprint sensing signal D to the first data lines 501, and further sends the first signal N1 to the common electrode 600.

As shown in FIG. 4, a sixth switch K3 is provided between the common voltage generation circuit 207 and the common electrode 600, and a seventh switch K4 is provided between the fingerprint sensing detection circuit 206 and the common electrode 600.

During the image display stage, the control unit 23 controls the sixth switch K3 to be switched on and controls the seventh switch K4 to be switched off. Hence, the common voltage generation circuit 207 is connected with the common electrode 600, and the common voltage VCOM may be provided to the common electrode 600 by the common voltage generation circuit 207.

During the fingerprint sensing stage (for example, in a case that the fingerprint sensing instruction is received), the control unit 23 controls the seventh switch K4 to be switched on and controls the sixth switch K3 to be switched off. Hence, the first signal N1 may be sent to the common electrode via the fingerprint sensing detection circuit 206.

More specifically, during the image display stage, the control unit 23 sends a display control signal for controlling the fourth switches K1, K2 . . . KQ and the sixth switch K3 to be switched on and controlling the fifth switches K1B, K2B . . . KQB and the seventh switch K4 to be switched off. Hence, the data line driving circuit 204 provides the display signals $S_1 \ldots S_N$ to the first electrodes 3011, and at the same time the common voltage generation circuit 207 provides the common voltage VCOM to the common voltage 600.

During the fingerprint sensing stage (for example, in the case that the fingerprint sensing instruction is received by the control unit 23), the control unit 23 sends the fingerprint sensing control signal for controlling the fifth switches K1B, K2B . . . KQB and the seventh switch K4 to be switched on and controlling the fourth switches K1, K2 . . . KQ and the sixth switch K3 to be switched off. Hence, the fingerprint sensing detection circuit 206 simultaneously provides square-wave pulse signals to the first electrodes 3011 and the common electrode 600, where the square-wave pulse signal applied to the first electrodes 3011 serve as the fingerprint sensing signal D and the square-wave pulse signal applied to the common electrode 600 serves as the first signal N1.

As shown in FIGS. 4 and 5, for making the color displayed by the second sub-pixel units 302 located outside the predetermined region 101 remain unchanged during the fingerprint sensing stage, optionally, the control unit 23 is further configured to control the second control switches 3022 connected with the second scanning lines 402 to be switched off during the fingerprint sensing stage. In this way, the pixel voltages on the second electrodes 3021 connected with the second scanning lines 402 remain unchanged. In addition, the common voltage on the common electrode 600 remains unchanged. Therefore, deflection angles of the liquid crystal molecules within the second sub-pixel units 302 located outside the predetermined region 101 may remain unchanged. Thereafter, the control unit 23 controls the fingerprint sensing control circuit 205 to send the fingerprint sensing control signal C to the first scanning lines 401 to switch on the first control switches 3012, and controls the fingerprint sensing detection circuit 206 to send the fingerprint sensing signal D to the first data lines 501.

As shown in FIGS. 4 and 5, the predetermined region 101 is a rectangular region located at a lower portion of the display panel 10. In the display panel 10, in addition to the second sub-pixel units 302 located at an upper portion of the display panel 10 above the predetermined region 101, a plurality of second sub-pixel units 302 are located on both sides of the predetermined region 101.

The second sub-pixel units 302 located on both sides of the predetermined region 101 of the display panel 10 are connected with the first scanning lines 401 and the second data lines 502. In a case that the fingerprint sensing control circuit 205 sends the fingerprint sensing control signal C to the first scanning lines 401, both the first control switches 3012 located within the predetermined region 101 and the second control switches 3022 of the second sub-pixel units 302 connected with the first scanning lines 401 are switched on.

Optionally, the control unit 23 is further configured to control the data line driving circuit 204 to send the display signals $S_1 \ldots S_N$ to the second data lines 502. Accordingly, the display signals $S_1 \ldots S_N$ are provided to the second electrodes 3021 of the second sub-pixel units 302 connected with the first scanning lines 401. Therefore, the image display may also be implemented on regions of the display panel which are located on both sides of the predetermined region 101 during the fingerprint sensing stage.

As shown in FIGS. 4 and 5, the display panel 10 includes a plurality of first sub-pixel units 301 located within the predetermined region 101 and a plurality of second sub-pixel units 302 located outside the predetermined region 101. The first sub-pixel units 301 include first red sub-pixel units, first green sub-pixel units and first blue sub-pixel units. The second sub-pixel units 302 include second red sub-pixel units, second green sub-pixel units and second blue sub-pixel units.

Figure 7:
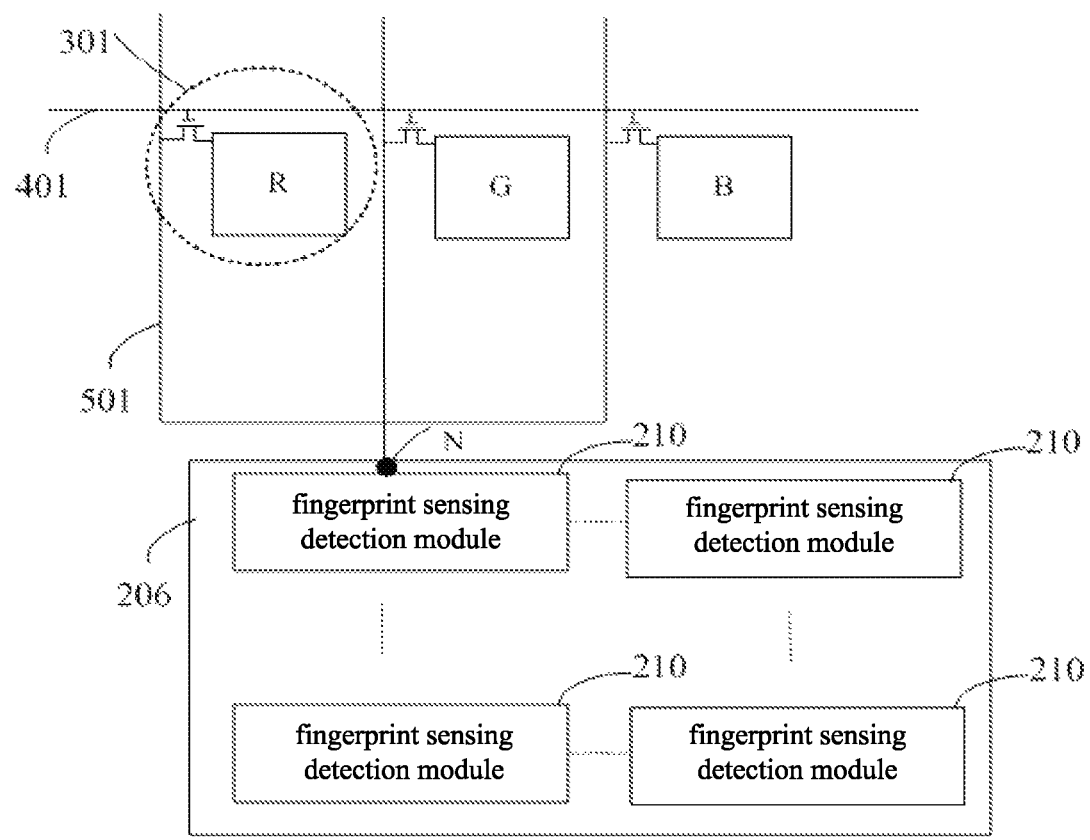
FIG. 7 is a schematic diagram of a fingerprint sensing detection circuit in FIG. 4.

FIG. 7 is a schematic diagram of the fingerprint sensing detection circuit 206 in FIG. 4. As illustrated in FIG. 7, the fingerprint sensing detection circuit 206 includes a plurality of fingerprint sensing detection modules 210. The fingerprint sensing detection modules 210 are configured to perform the fingerprint sensing on the first sub-pixel units 301 in the display panel 10 simultaneously. Specifically, one fingerprint sensing detection module 210 is configured to perform the fingerprint sensing on one first red sub-pixel unit (R), one first green sub-pixel unit (G) and one first blue sub-pixel unit (B) in the display panel 10 simultaneously, thereby improving the efficiency in fingerprint sensing and simplifying the fingerprint sensing detection circuit 206.

However, it is not limited thereto in the disclosure. In other embodiment, one fingerprint sensing detection module 210 may perform the fingerprint sensing on only one first sub-pixel unit 301, to improve the accuracy of fingerprint sensing.

In the display panel 10, one pixel unit at least includes one red sub-pixel unit (R), one green sub-pixel unit (G) and one blue sub-pixel unit (B). Some of the pixel units may also include other sub-pixel units such as a white sub-pixel unit. Specifically, the pixel units located within the predetermined region 101 and configured to implement the fingerprint sensing and the image display are defined as first pixel units. Each first pixel unit includes one first red sub-pixel unit, one first green sub-pixel unit and one first blue sub-pixel unit. The pixel units located outside the predetermined region 101 are defined as second pixel units, and each second pixel unit includes one second red sub-pixel unit, one second green sub-pixel unit and one second blue sub-pixel unit.

Optionally, the fingerprint sensing detection module 210 is configured to perform the fingerprint sensing on all sub-pixel units of one first pixel unit simultaneously, thereby improving the efficiency in fingerprint sensing and leading to easier control.

Figure 8:
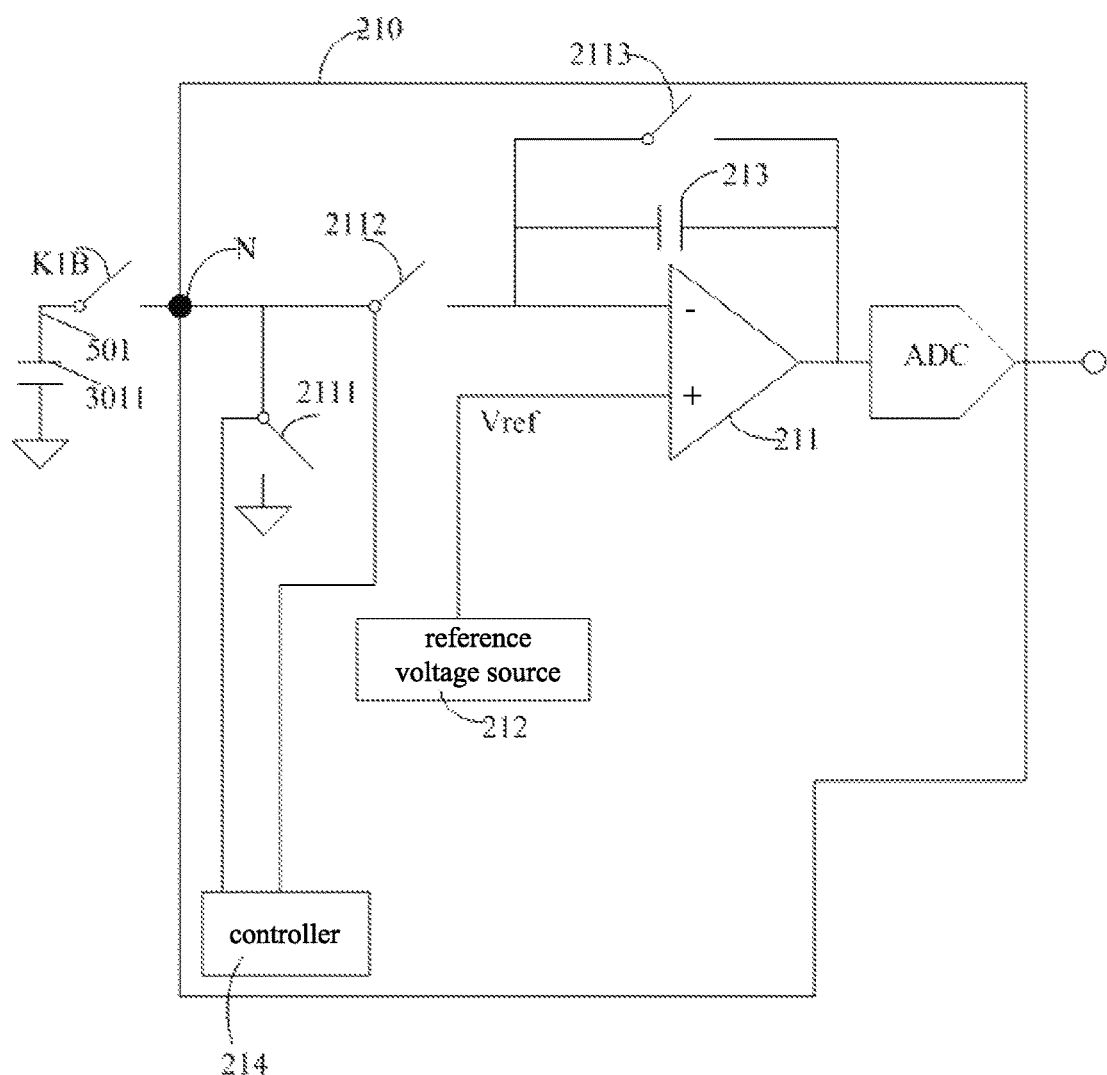
FIG. 8 is a schematic diagram of an example of a fingerprint sensing detection module in FIG. 7.

FIG. 8 is a schematic diagram of the fingerprint sensing detection module 210 shown in FIG. 7. It should be noted that, since the first control switch 3012 between the first electrode 3011 and the data line 501 is switched on during the fingerprint sensing stage, the first control switch 3012 is equivalent to a wire and is not shown in FIG. 8.

Specifically, the fingerprint sensing detection module 210 includes:

an operational amplifier 211 in a virtual short state;

a reference voltage source 212 connected with a non-inverting input terminal of the operational amplifier 211 and configured to provide a reference voltage, the reference voltage being 2V in the embodiment;

a feedback capacitor 213 having one plate connected to an inverting input terminal of the operational amplifier 211 and the other plate connected to an output terminal of the operational amplifier 211;

a first switch 2111 having one terminal connected to the first data line 501 and the other terminal connected to a first voltage source for outputting a first voltage, wherein the first voltage source is the ground (0V), and a first node N is defined between the first switch 2111 and the first data line 501;

a second switch 2112 having one terminal connected to the first node N and the other terminal connected to the inverting input terminal of the operational amplifier 211;

a third switch 2113 connected in parallel with the feedback capacitor 213; and a controller 214 configured to output a first control signal and a second control signal in time division mode, where the first control signal is configured to switch on the first switch 2111 and the third switch 2113 and to switch off the second switch 2112, to discharge the electric quantity stored in the feedback capacitor 213, and the second control signal is configured to switch on the second switch 2112 and to switch off the first switch 2111 and the third switch 2113, to charge the first electrode 3011 forming a self-capacitor and charge the feedback capacitor 213, with the reference voltage source 212.

To perform the self-capacitance detection on the first electrode 3011, the first control signal and the second control signal, output by the controller 214 in time division mode, form the fingerprint sensing signal D, which is the square-wave pulse signal with a low level of 0V and a high level of 2V as shown in FIG. 6.

Specifically, the fingerprint sensing detection module 210 further includes a computation unit. The computation unit is connected with the output terminal of the operational amplifier 211, and is configured to acquire the voltage at the output terminal of the operational amplifier 211 and obtain the self-capacitance $C_{11}$ of the first electrode based on the voltage Vout at the output terminal of the operational amplifier 211, the reference voltage Vref of the reference voltage source and a capacitance $C_{15}$ of the feedback capacitor. Specifically, the self-capacitance $C_{11}$ of the first electrode 3011 may be given according to the following equation:

$$C_{11}=[(Vout-Vref)*C_{15}]/Vref.$$

During the fingerprint sensing, capacitances to ground (i.e., the self-capacitances $C_{11}$) of the first electrodes 3011 change when the predetermined region 101 is touched by a finger, and ridges and valleys of the fingerprint lead to different variations of the capacitances $C_{11}$. Distances between the fingerprint and the first electrodes 3011 may be obtained based on the variations of the capacitances, and fingerprint information may be further obtained based on combination of the distances between the fingerprint and the first electrodes and positions where the first electrodes 3011 are located in the display panel 10, thereby accomplishing the fingerprint sensing.

It should be noted that, for the case that the first signal N1 is identical with the fingerprint sensing signal D and the first signal generation circuit 208 is integrated in the fingerprint sensing detection circuit 206, the fingerprint sensing detection module 210 may also be implemented in other ways.

Figure 9:
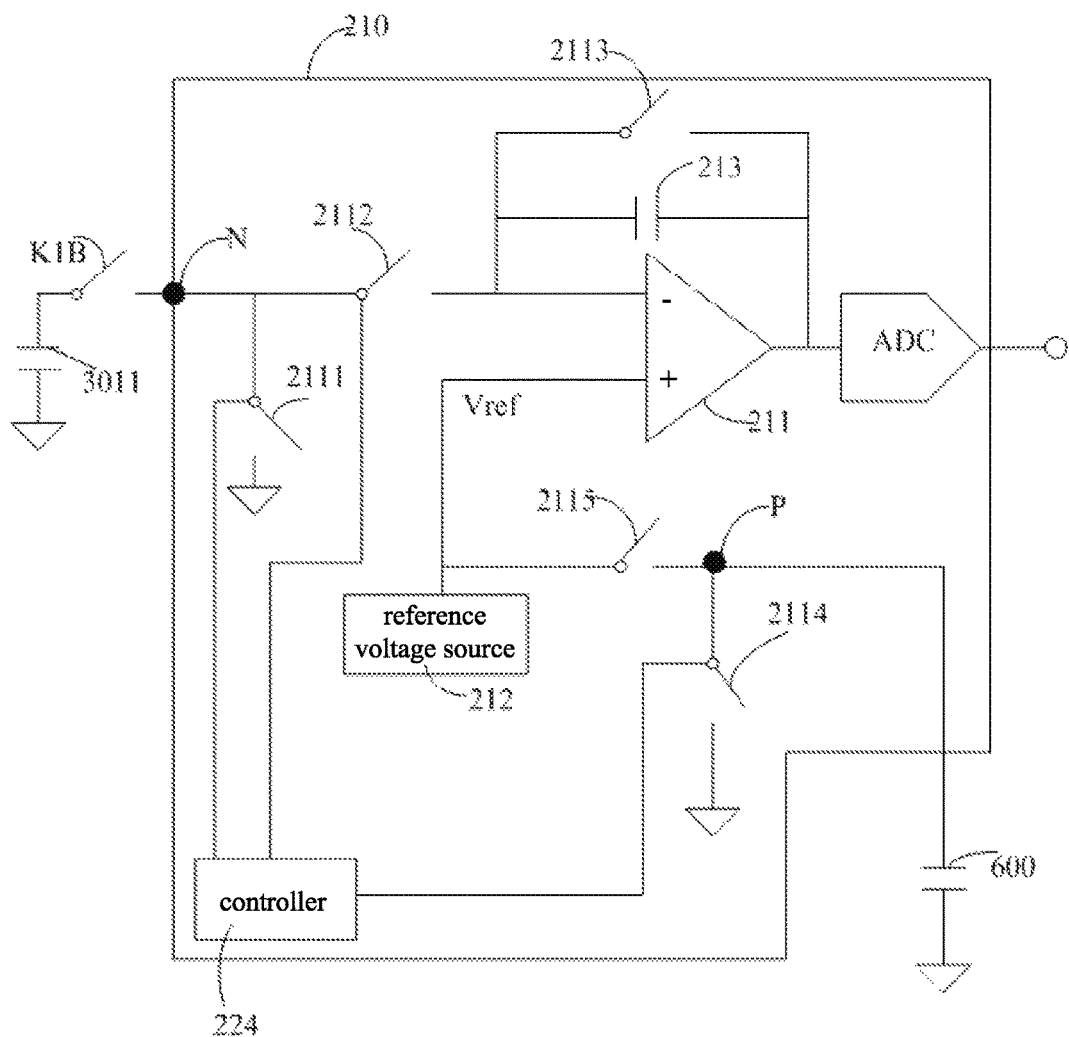
FIG. 9 is a schematic diagram of an example of the fingerprint sensing detection module in FIG. 7.

FIG. 9 illustrates a fingerprint sensing detection module 210. Parts identical with those in FIG. 8 are not repeated. Different from FIG. 8, the fingerprint sensing detection module 210 in FIG. 9 further includes an eighth switch 2114, a ninth switch 2115, and a controller 224.

The eighth switch 2114 has one terminal connected to the common electrode 600 and the other terminal connected to a second voltage source for outputting a second voltage. In the embodiment, the second voltage is 0V and the second voltage source is the ground. A second node P is defined between the eighth switch 2114 and the common electrode 600.

The ninth switch 2115 has one terminal connected to the second node P and the other terminal connected to the reference voltage source 212.

The controller 224 is configured to output a third control signal and a fourth control signal in time division mode. The third control signal is configured to switch on the first switch 2111, the eighth switch 2114 and the third switch 2113 and to switch off the second switch 2112 and the ninth switch 2115, to discharge the electric quantity stored in the feedback capacitor 213. The fourth control signal is configured to switch on the second switch 2112 and the ninth switch 2115 and to switch off the first switch 2111, the eighth switch 2114 and the third switch 2113, to charge the first electrode 3011 forming a self-capacitor, the common electrode 600 forming a self-capacitor, and the feedback capacitor 213, with the reference voltage source 212.

The third control signal and the fourth control signal, output by the controller 224 in time division mode, form the square-wave pulse signal with a low level of 0V and a high level of 2V as shown in FIG. 6. The square-wave pulse signal output by the fingerprint sensing detection module 210 is provided to the first electrode 3011 as the fingerprint sensing signal D, and is also provided to the common electrode 600 as the first signal N1.

It should be noted that, as shown in FIG. 6, the fingerprint sensing signal D is a periodic square-wave pulse signal in which the high level and the low level are alternatively output. Specifically, in the embodiment, the fingerprint sensing signal D has a low level of 0V and a high level of 2V. However, the form, amplitude, and frequency of the fingerprint sensing signal D are not limited in the disclosure. The fingerprint sensing signal D may be a step signal or any other appropriate type of signal.

It should also be noted that, the first voltage source and the second voltage in FIGS. 8 and 9 are ground, and the output voltages thereof are 0V which is smaller than the reference voltage of 2V. However, it is not limited thereto in the disclosure, and the first voltage provided by the first voltage source may be identical with or different from the second voltage provided by the second voltage source. Furthermore, the first voltage and the second voltage may be greater than the reference voltage.

Figure 10:
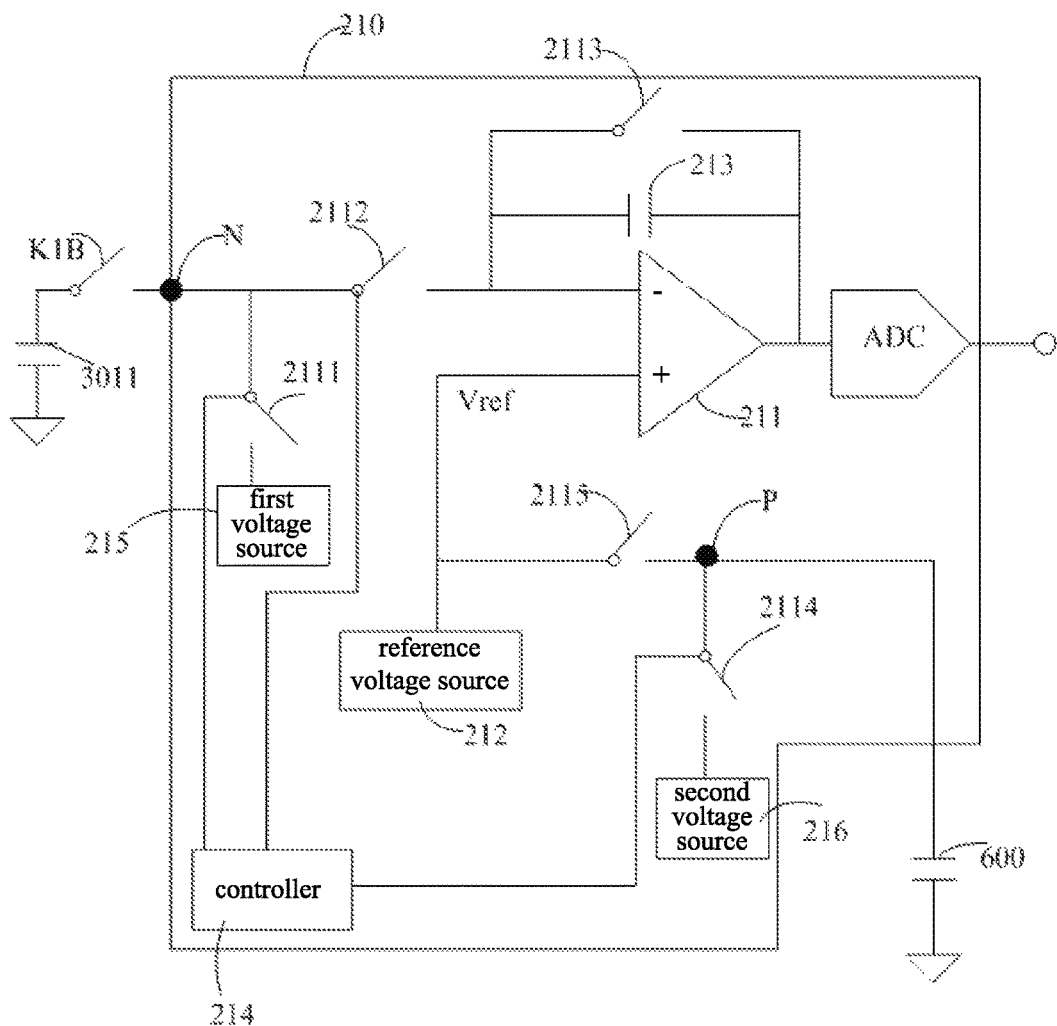
FIG. 10 is a schematic diagram of an example of the fingerprint sensing detection module in FIG. 7.

The same parts of a fingerprint sensing detection module 210 shown in FIG. 10 and the fingerprint sensing detection module 210 shown in FIG. 9 are not repeated. Differences between the fingerprint sensing detection module 210 shown in FIG. 10 and the fingerprint sensing detection module 210 shown in FIG. 9 are described as follows.

In FIG. 10, the first switch 2111 has one terminal connected with the first data line 501 and the other terminal connected with a first voltage source 215 for outputting a first voltage, and the eighth switch 2114 has one terminal connected with the common electrode 600 and the other terminal connected with a second voltage source 216 for outputting a second voltage.

In the embodiment, the first voltage provided by the first voltage source 215 and the second voltage provided by the second voltage source 216 are high voltages Vh. The high voltages Vh are higher than the reference voltage. The high voltages Vh may be 12V, for example.

The controller 224 is configured to output a third control signal and a fourth control signal in time division mode. The third control signal is configured to switch on the first switch 2111, the eighth switch 2114 and the third switch 2113 and to switch off the second switch 2112 and the ninth switch 2115, to charge the first electrode 3011 forming a self-capacitor with the high voltage Vh. The fourth control signal is configured to switch on the second switch 2112 and the ninth switch 2115 and to switch off the first switch 2111, the eighth switch 2114 and the third switch 2113, to discharge the first electrode 3011 forming the self-capacitor with the reference voltage.

Specifically, the self-capacitance $C_{11}$ of the first electrode 3011 may be given according to the following equation:

$$C_{11}=[(Vout-Vref)*C_{15}]/(Vh-Vref).$$

The fingerprint sensing signal output by the fingerprint sensing detection module 210 shown in FIG. 10 has a low level of 2V, a high level of 12V and an amplitude of 10V. A signal-to-noise ratio of the fingerprint sensing caused by the fingerprint sensing signal having an amplitude of 10V is five times larger than that caused by the fingerprint sensing signal having the amplitude of 2V as shown in FIG. 6, thereby improving the accuracy of fingerprint sensing.

Figure 11:
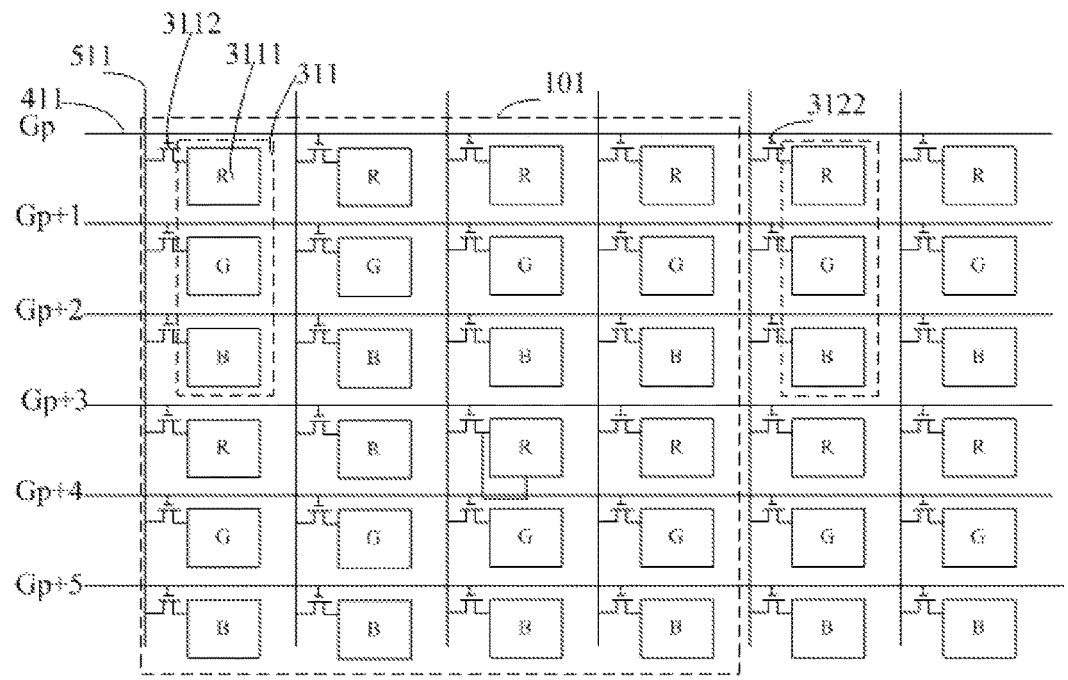
FIG. 11 is a schematic diagram of a fingerprint sensing unit in a display device according to an embodiment of the disclosure.
Figure 12:
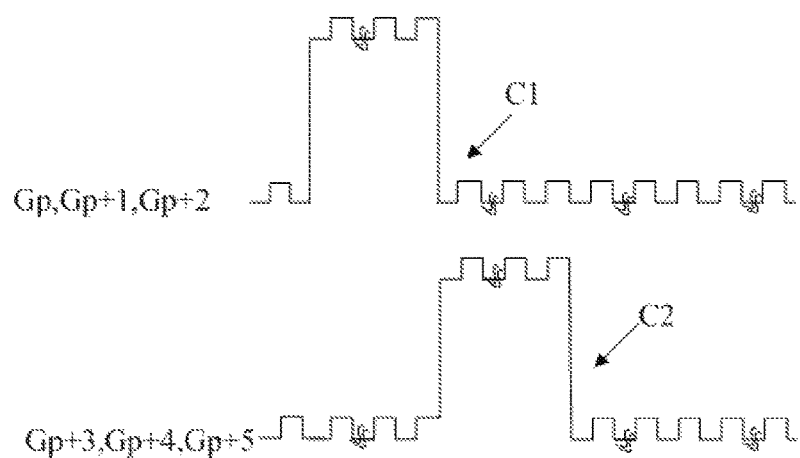
FIG. 12 is a schematic diagram showing fingerprint sensing signals of the fingerprint sensing unit in FIG. 11.

FIG. 11 is a schematic diagram of a fingerprint sensing unit in a display device according to an embodiment of the disclosure, and FIG. 12 is a schematic diagram of fingerprint sensing signals. Here, it is illustrated by taking a low temperature poly-silicon display device as an example, and first control switches 3112 and second control switches 3122 in a display panel 10 of the display device are poly-silicon thin film transistors.

The first control switch 3112 of a first red sub-pixel unit R, the first control switch 3112 of a first green sub-pixel unit G and the first control switch 3112 of a first blue sub-pixel unit B in a first pixel unit 311 located at a predetermined region 101 are connected with different first scanning lines 411 respectively and are connected with an identical first data line 511.

The fingerprint sensing control circuit 205 provides the fingerprint sensing control signal simultaneously to three first scanning lines 411 respectively connected with the first red sub-pixel unit R, the first green sub-pixel unit G and the first blue sub-pixel unit B in one first pixel unit 311, to simultaneously switch on the first control switch 3112 of the first red sub-pixel unit R, the first control switch 3112 of the first green sub-pixel unit G and the first control switch 3112 of the first blue sub-pixel unit B in the first pixel unit 311. For example, a first fingerprint sensing control signal C1 is provided to three first scanning lines 411 labeled Gp, Gp+1, Gp+2 simultaneously. With the first fingerprint sensing control signal C1, the first red sub-pixel unit R connected with Gp, the first green sub-pixel unit G connected with Gp+1 and the first blue sub-pixel unit B connected with Gp+2 are switched on simultaneously. Alternatively, a second fingerprint sensing control signal C2 is provided to three first scanning lines 411 labeled Gp+3, Gp+4, Gp+5 simultaneously. With the second fingerprint sensing control signal C2, the first red sub-pixel unit R connected with Gp+3, the first green sub-pixel unit G connected with Gp+4 and the first blue sub-pixel unit B connected with Gp+5 are switched on simultaneously.

The fingerprint sensing detection circuit 206 provides the fingerprint sensing signal D for performing the self-capacitance detection to the first red sub-pixel unit R, the first green sub-pixel unit G and the first blue sub-pixel unit B in the first pixel unit 311 via the first data line 511.

It should be noted that, the first fingerprint sensing control signal C1 and the second fingerprint sensing control signal C2 shown in FIG. 12 are pulse signals having the same frequency, the same phase and the same amplitude as the fingerprint sensing signal D, thereby switching on the first control switches 3112 during the fingerprint sensing and further reducing electric quantities in charging and discharging capacitors formed by the first scanning lines 411 and the first electrodes 3111.

However, it is not limited thereto in the disclosure. In other embodiments, the first fingerprint sensing control signal C1 and the second fingerprint sensing control signal C2 may be pulse signals having the same frequency and the same phase as the fingerprint sensing signal D, the first control switches 3112 may also be switched on during the fingerprint sensing and the electric quantities in charging and discharging the capacitors formed by the first scanning lines 411 and the first electrodes 3111 may also be reduced. Alternatively, the first fingerprint sensing control signal C1 and the second fingerprint sensing control signal C2 may be identical with a scanning driving signal, and the first control switches 3112 of the first red sub-pixel unit R, the first green sub-pixel unit G and the first blue sub-pixel unit B in one first pixel unit 311 may also simultaneously switched on.

Figure 13:
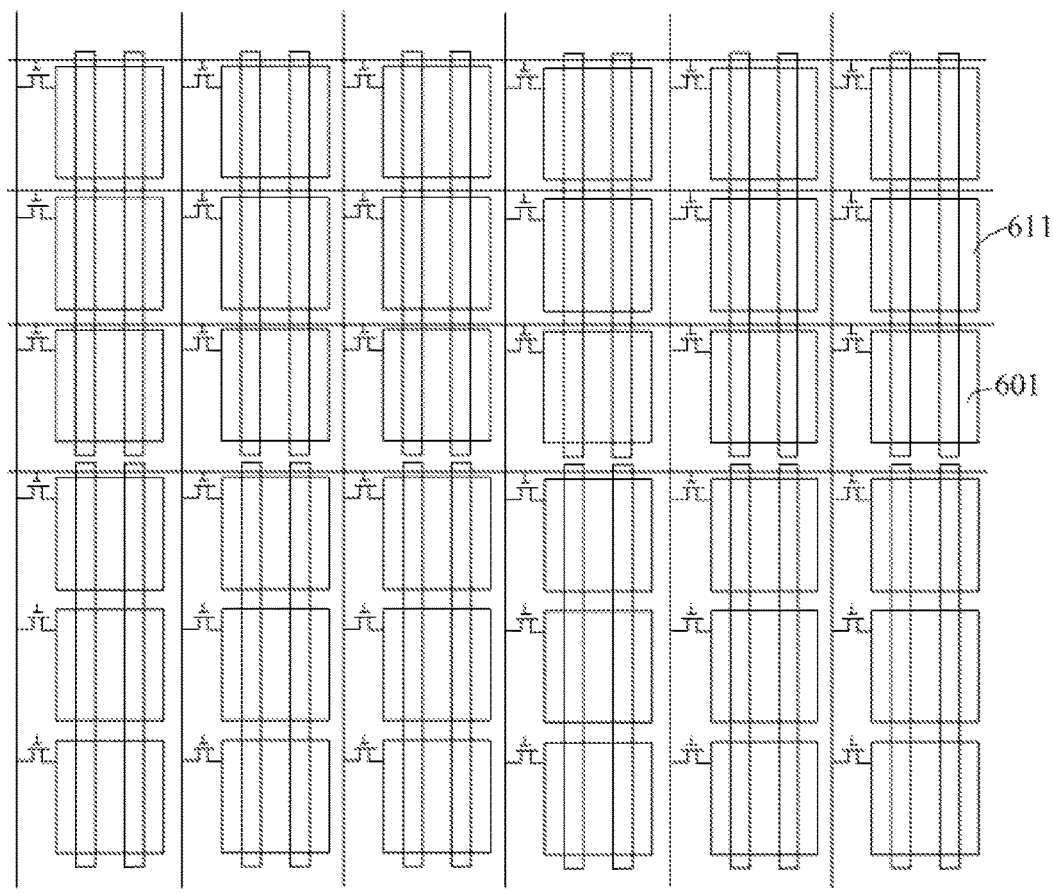
FIG. 13 is a schematic diagram of a display device according to an embodiment of the disclosure.

FIG. 13 is a schematic diagram of a display device according to an embodiment of the disclosure. In the embodiment, it is illustrated by taking an In-Plane Switching (IPS) liquid crystal display device as an example. In the embodiment, a display panel in the liquid crystal display device is a liquid crystal display panel, and the liquid crystal display panel includes a first substrate (not shown in FIG. 13), a second substrate (not shown in FIG. 13) and a liquid crystal layer between the first substrate and the second substrate (not shown in FIG. 13). The display electrodes are pixel electrodes 611, and the pixel electrodes 611 are located between the first substrate and the second substrate. A plurality of common electrodes 601 are located between the pixel electrodes 611 and the liquid crystal layer, and an insulation layer (not shown in FIG. 13) is provided between the common electrodes 601 and the pixel electrodes 611 at a region where the common electrodes 601 overlap with the pixel electrodes 611, to insulate the common electrodes 601 from the pixel electrodes 611. In the embodiment, the projection area of one common electrode 601 onto one pixel electrode 611 is smaller than the area of the pixel electrode 611, to form a parallel electric field.

It should be noted that, in the liquid crystal display device, the first substrate, the pixel electrodes 611, the common electrodes 601, the liquid crystal layer and the second substrate are stacked layer by layer, and the projection of one common electrode 601 onto one pixel electrode 611 refers to a projection of one common electrode 601 onto one pixel electrode 611 in a stacking direction.

In the embodiment, each common electrode 601 is a stripline electrode, but it is not limited thereto in the disclosure, and each of the common electrodes 601 may be a comb-like electrode or a square-shaped electrode.

In the above embodiments, the image display function and the fingerprint sensing function are integrated into the display device. However, the display device provided by the disclosure is not limited thereto, and the display device provided by the disclosure may further have a touch detection function.

Figure 14:
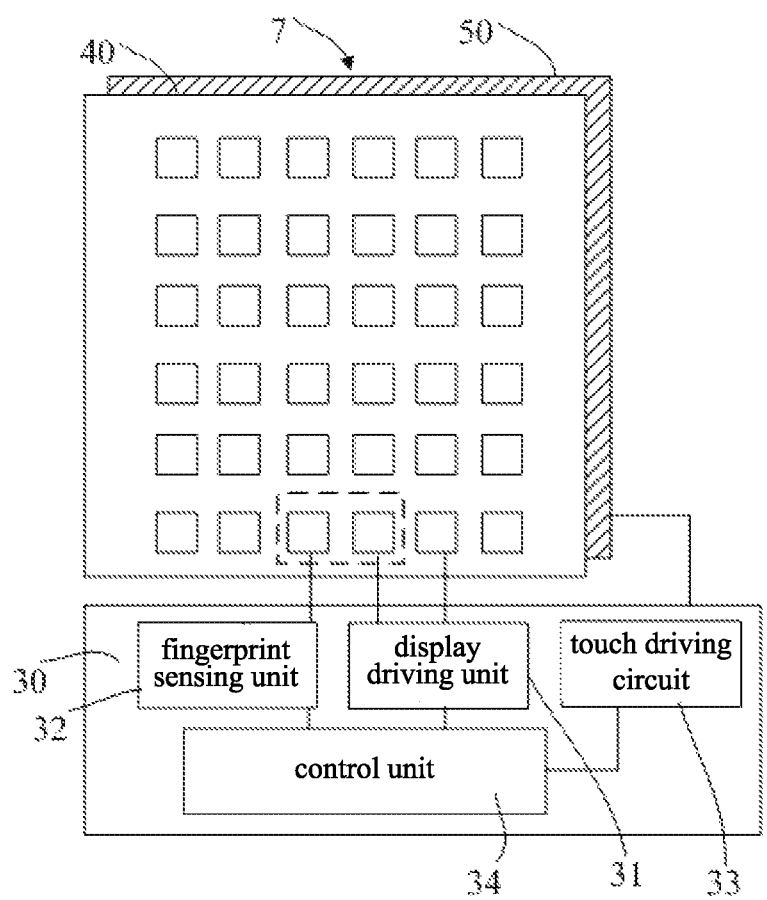
FIG. 14 is a schematic diagram of a display device according to an embodiment of the disclosure.

FIG. 14 is a schematic diagram of a display device according to an embodiment of the disclosure. The display device 7 further includes a touch-sensitive unit 50 stacked on a display panel 40. For example, the touch-sensitive unit 50 is an out-cell touch-sensitive unit. Alternatively, the touch-sensitive unit 50 is a part of the display panel 40. For example, the touch-sensitive unit 50 is an on cell touch-sensitive unit or an in-cell touch-sensitive unit.

The driving circuit 30 further includes a touch driving circuit 33 configured to perform a touch detection on the touch-sensitive unit 50.

The control unit 34 is connected with the touch driving circuit 33 and is configured to control the display driving unit 31, the touch driving circuit 33 and the fingerprint sensing unit 32 in a time-division mode, to implement the image display stage, a touch detection stage and the fingerprint sensing stage respectively.

Figure 15:
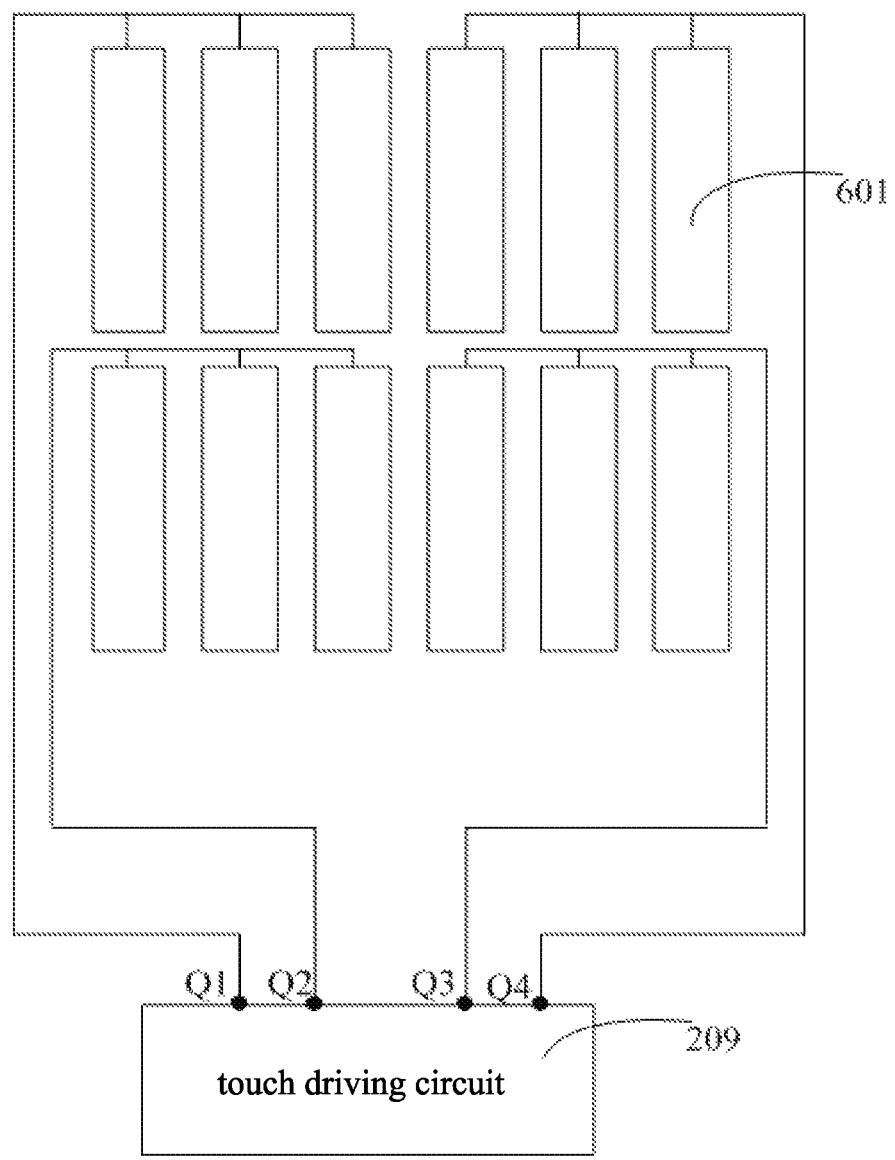
FIG. 15 is a schematic diagram of a touch-sensitive unit in FIG. 14.

FIG. 15 is a schematic diagram of the touch-sensitive unit in FIG. 14. A plurality of common electrodes 601 are disposed in the display panel. The common electrodes 601 may provide a common voltage VCOM to sub-pixel units during the image display stage, and may serve as self-capacitive electrodes for the touch detection.

Specifically, as shown in FIG. 15, the common electrodes 601 may be divided into a plurality of groups, and the common electrodes in one group are connected to an identical node of Q1, Q2, Q3 and Q4 of a touch driving circuit 209. Q1, Q2, Q3 and Q4 are terminals for touch detection. The touch driving circuit provides a self-capacitive touch detection signal to the common electrodes connected to an identical node.

As shown in FIGS. 4 and 5, optionally, a sixth switch K3 is provided between the common electrode 600 and the common voltage generation circuit 207, and a tenth switch K5 is provided between the common electrode 600 and the touch driving circuit 209. During the image display stage, the control unit 23 may control the sixth switch K3 to be switched on and may control the tenth switch K5 to be switched off, to provide the common voltage VCOM to the common electrode 600. During the touch detection stage, the control unit 23 may control the tenth switch K5 to be switched on and may control the sixth switch K3 to be switched off, to provide the touch detection signal to the common electrode 600, thereby detecting whether the display panel is touched by a finger and detecting a position where the finger touches the display panel.

Optionally, the common electrode 600 may be applied with the first signal during the fingerprint sensing stage to improve the accuracy of fingerprint sensing. In this case, a seventh switch K4 is further provided between the common electrode 600 and the fingerprint sensing detection circuit 206. The control unit 23 is configured to, control the sixth switch K3 to be switched on and control the seventh switch K4 and the tenth switch K5 to be switched off during the image display stage, control the tenth switch K5 to be switched on and control the sixth switch K3 and the seventh switch K4 to be switched off during the touch detection stage, and control the seventh switch K4 to be switched on and control the sixth switch K3 and the tenth switch K5 to be switched off during the fingerprint sensing stage.

Figure 16:
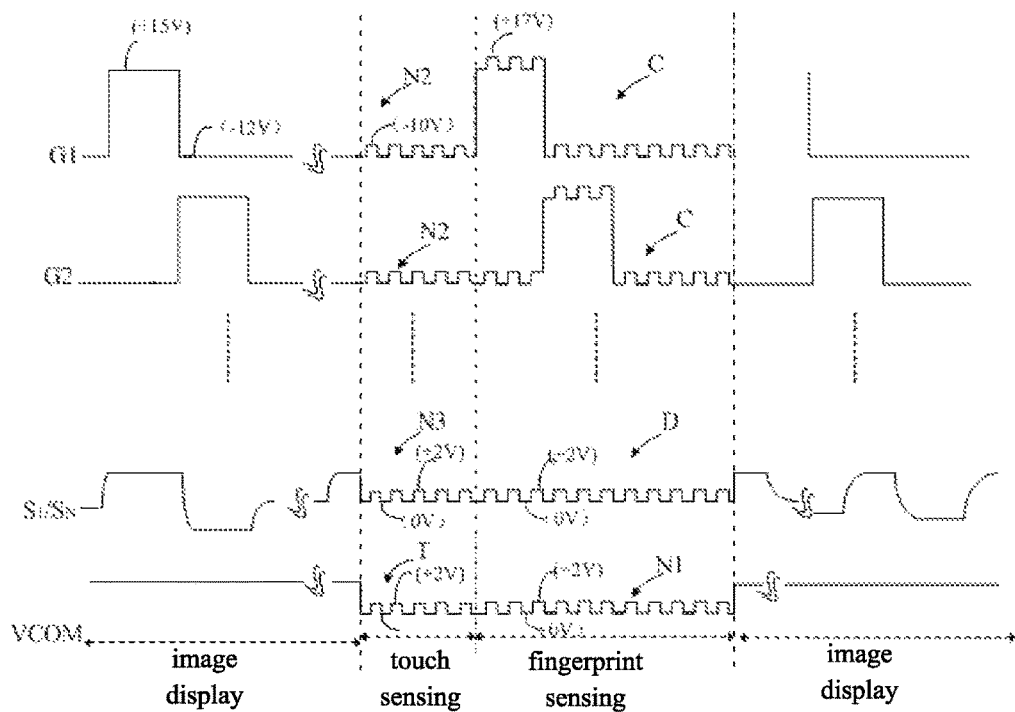
FIG. 16 is a schematic diagram showing signals of a driving circuit in FIG. 14.

FIGS. 4, 5 and 16 may be referred in combination. FIG. 16 is a schematic diagram of signals of the driving circuit in the display device shown in FIG. 14.

For improving the accuracy of touch detection, the driving circuit 20 further includes a second signal generation circuit (not shown in FIGS. 4 and 5). The second signal generation circuit is connected with the first scanning lines 401 and the second scanning lines 402 and is configured to provide a second signal N2. The control unit 23 is configured to control the second signal generation circuit to provide the second signal N2 to the first scanning lines 401 and the second scanning lines 402 during the touch detection. With the second signal N2, the control switches may be controlled to be in a switched-off state, and the electric quantities in charging and discharging capacitors formed by the common electrodes 601 and the first scanning lines 401 and the electric quantities in charging and discharging capacitors formed by the common electrodes 601 and the second scanning lines 402 may be reduced.

Specifically, sets of switches may be provided respectively between the second signal generation circuit and the first scanning lines 401, between the second signal generation circuit and the second scanning lines 402, between the scanning line driving circuit and the first scanning lines 401 and between the scanning line driving circuit and the second scanning lines 402, and the control unit 23 may control whether the second signal generation circuit or the scanning line driving circuit is connected with the first scanning lines 401 and the second scanning lines 402 by controlling the switches.

In the embodiment, the control switch is an N-type TFT, the touch detection signal T is a square-wave pulse signal with a low level of 0V and a high level of 2V, and the second signal N2 is a pulse signal with a high level of −10V and a low level of −12V, which has the same frequency, the same phase and the same amplitude as the touch detection signal T (the amplitude is 2V for both the second signal N2 and the touch detection signal T). The level of −10V or −12V may lead to cut-off of the N-type TFT. Since voltage differences between polar plates of capacitors formed by the common electrode 600 and the first scanning lines 401 (or the second scanning lines 402) are zero, the electric quantities in charging and discharging the capacitors formed by the common electrode 600 and the first scanning lines 401 and the electric quantities in charging and discharging the capacitors formed by the common electrode 600 and the second scanning lines 402 may be reduced during the touch detection stage. Therefore, parasitic capacitances between the common electrode and the first scanning lines 401 and parasitic capacitances between the common electrode and the second scanning lines 402 may be reduced, leading to an improvement of the accuracy of a self-capacitive touch detection.

It should be noted that, it is illustrated here by taking the case that the second signal N2 is a pulse signal having the same frequency, the same phase and the same amplitude as the touch detection signal T as an example, but it is not limited thereto in the disclosure. The second signal N2 may be a pulse signal having the same frequency and the same phase as the touch detection signal T, and the electric quantities in charging and discharging the capacitors may also be reduced as long as the voltage across each capacitor is reduced.

Similarly, the driving circuit 20 may further include a third signal generation circuit (not shown in FIGS. 4 and 5). The third signal generation circuit is connected with the first data lines 501 and the second data lines 502 and is configured to provide a third signal N3. The control unit 23 is configured to control the third signal generation circuit to provide the third signal N3 to the first data lines 501 and the second data lines 502 during the touch detection. With the third signal, the electric quantities in charging and discharging capacitors formed by the common electrode 600 and the first data lines 501 and the electric quantities in charging and discharging capacitors formed by the common electrode 600 and the second data lines 502 may be reduced.

Specifically, sets of switches may be provided respectively between the third signal generation circuit and the first data lines 501, between the third signal generation circuit and the second data lines 502, between the data line driving circuit and the first data lines 501 and between the data line driving circuit and the second data lines 502, and the control unit 23 may control whether the third signal generation circuit or the data line driving circuit is connected with the first data lines 501 and the second data lines 502 by controlling the switches.

In the embodiment, the touch detection signal T is a square-wave pulse signal with a low level of 0V and a high level of 2V, and the third signal N3 is also a square-wave pulse signal with a low level of 0V and a high level of 2V. Since the third signal N3 is identical with the touch detection signal T, the voltage differences between the polar plates of the capacitors formed by the common electrode 600 and the first data lines 501 (or the second data lines 502) may maintain unchanged. Therefore, the electric quantities in charging and discharging the capacitors formed by the common electrode 600 and the first data lines 501 and the electric quantities in charging and discharging the capacitors formed by the common electrode 600 and the second data lines 502 may be reduced during the touch detection stage. Accordingly, parasitic capacitances between the common electrode 600 and the first data lines 501 and parasitic capacitances between the common electrode 600 and the second data lines 502 may be reduced, thereby improving the accuracy of the self-capacitive touch detection.

It should be noted that, it is illustrated here by taking the case that the third signal N3 is identical with the touch detection signal T as an example, but it is not limited thereto in the disclosure. The third signal N3 may be a pulse signal having the same frequency, the same phase and the same amplitude as the touch detection signal T, and the voltage difference between the two polar plates of each capacitor formed by the common electrode 600 and the first data line 501 and the voltage difference between the two polar plates of each capacitor formed by the common electrode 600 and the second data line 502 are zero. Alternatively, the third signal N3 may be a pulse signal having the same frequency and the same phase as the touch detection signal T, and the electric quantities in charging and discharging the capacitors may also be reduced if the voltage difference between the two polar plates of each capacitor formed by the common electrode 600 and the first data line 501 and the voltage difference between the two polar plates of each capacitor formed by the common electrode 600 and the second data line 502 are reduced.

Figure 17:
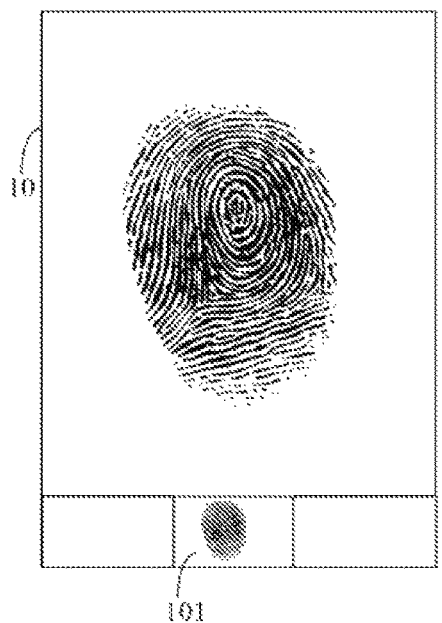
FIG. 17 is a schematic diagram of a display device according to an embodiment of the disclosure.

FIG. 17 is a schematic diagram of a display device according to an embodiment of the disclosure. In the embodiment, the display device may also display a fingerprint image, which is obtained through fingerprint sensing in the predetermined region 101, on a display panel 10.

Specifically, as shown in FIG. 3, the control unit 23 is further configured to send fingerprint information obtained by the fingerprint sensing unit 22 to the display driving unit 21, after the fingerprint sensing unit 22 completes the fingerprint sensing or when the fingerprint sensing unit 22 performs the fingerprint sensing.

The display driving unit 21 is further configured to provide display signals corresponding to the fingerprint information to the display electrodes 300, to display the fingerprint image.

By displaying the fingerprint image on the display panel 10, a user can clearly know a position where his finger touches in the predetermined region 101, thereby leading to an accurate and complete fingerprint sensing for the fingerprint.

It should be noted that, in the above embodiments, the first electrodes 3011 in the display device 5 not only serve as the display electrodes during the image display stage, but also serve as the self-capacitance detection electrodes during the fingerprint sensing stage, that is, the first electrodes 3011 located at the predetermined region 101 have two functions. However, it is not limited thereto in the disclosure. A display device is further provided according to the disclosure, in which the first electrodes 3011 located at the predetermined region 101 of the display panel 10 only serve as the self-capacitance detection electrodes during the fingerprint sensing stage, thereby reducing mutual interference between the image display and the fingerprint sensing.

Figure 18:
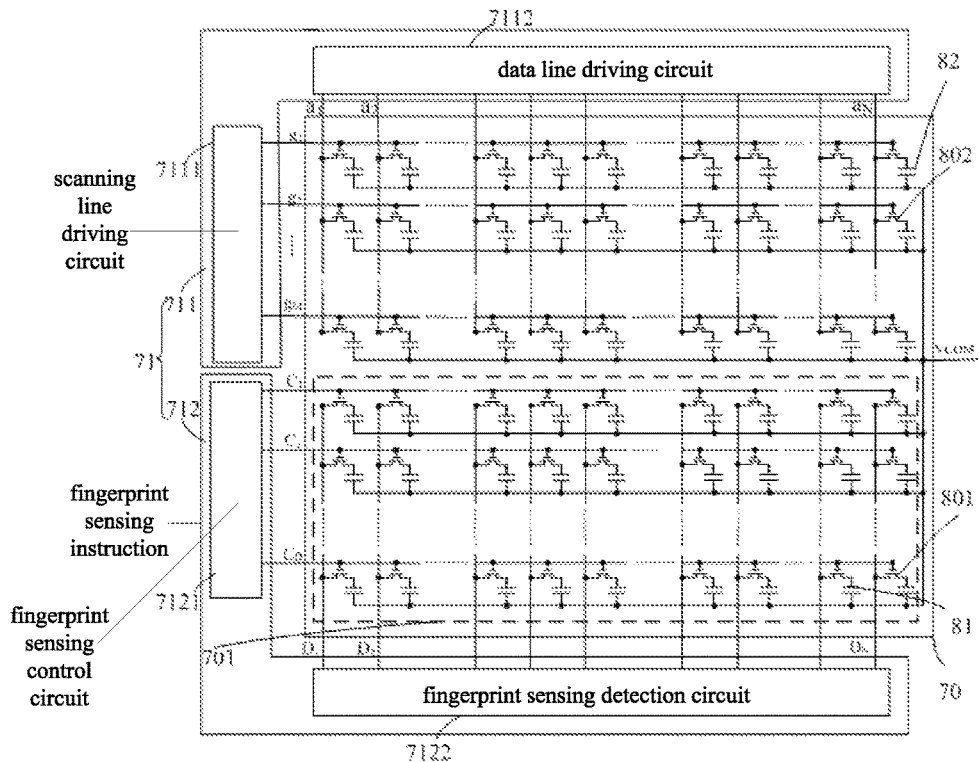
FIG. 18 is a schematic diagram of a display device according to an embodiment of the disclosure.
Figure 19:
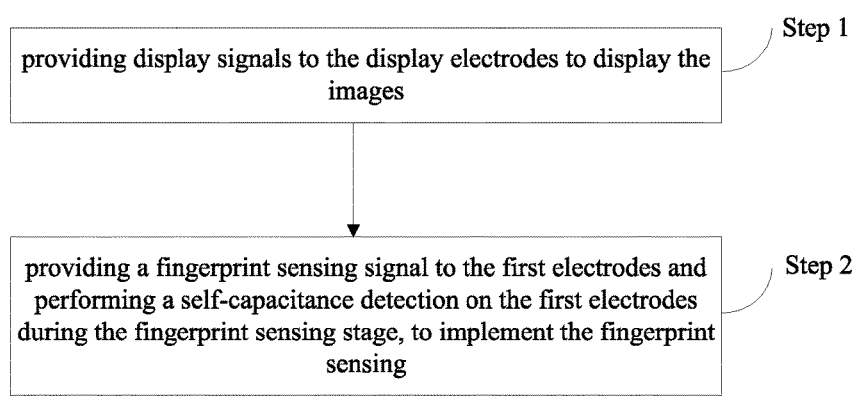
FIG. 19 is a flowchart of a method for driving a display device according to an embodiment of the disclosure.

FIG. 18 is a schematic diagram of a display device according to an embodiment of the disclosure. The display device includes a display panel 70 and a driving circuit 71.

First electrodes 81 are provided at a predetermined region 701 of the display panel 70 and second electrodes 82 are provided outside the predetermined region 701.

The driving circuit 71 is configured to provide a fingerprint sensing signal to the first electrodes 81 and perform a self-capacitance detection on the first electrodes 81, to implement the fingerprint sensing. The driving circuit 71 is further configured to provide display signals to the second electrodes 82 to implement the image display.

As shown in FIG. 18, the driving circuit 71 includes:

a display driving unit 711, configured to provide the display signals to the second electrodes 82 to implement the image display; and a fingerprint sensing unit 712, configured to provide the fingerprint sensing signal to the first electrodes 81 and perform the self-capacitance detection on the first electrodes 81, to implement the fingerprint sensing.

Specifically, the display panel 70 is provided with first scanning lines C1, C2 . . . Cp arranged in rows, first data lines D1, D2 . . . DN arranged in columns, and first control switches 801 connected with the first scanning lines C1, C2 . . . Cp and the first data lines D1, D2 . . . DN. Each first control switch 801 includes a control terminal, a first terminal and a second terminal. The control terminal is configured to control whether a signal may be conducted between the first terminal and the second terminal. The control terminals of the first control switches 801 are connected with the first scanning lines, the first terminals are connected with the first data lines D1, D2 . . . DN, and the second terminals are correspondingly connected with the first electrodes 81.

Correspondingly, the fingerprint sensing unit 712 includes a fingerprint sensing control circuit 7121 connected with the first scanning lines $C_1, C_2 \ldots C_p$ and configured to provide a fingerprint sensing control signal to switch on the first control switches 801. The fingerprint sensing unit 712 further includes a fingerprint sensing detection circuit 7122 connected with the first data lines $D_1, D_2 \ldots D_N$ and configured to provide the fingerprint sensing signal for performing the self-capacitance detection. The first control switches 801 which are switched on may transmit the fingerprint sensing signal to the first electrodes 81. Hence, the self-capacitance detection is performed on the first electrodes 81 and fingerprint information may be obtained based on variations of self-capacitances.

Specifically, the fingerprint sensing unit 712 may perform the fingerprint sensing in response to a trigger of a fingerprint sensing instruction.

As shown in FIG. 18, the display panel 70 is further provided with second scanning lines $g_1, g_2 \ldots g_M$ arranged in rows, second data lines $a_1, a_2 \ldots a_N$ arranged in columns, and second control switches 802 connected with the second scanning lines $g_1, g_2 \ldots g_M$ and the second data lines $a_1, a_2 \ldots a_N$. Each second control switch 802 includes a control terminal, a first terminal and a second terminal. The control terminal is configured to control whether a signal may be conducted between the first terminal and the second terminal. The control terminals of the second control switches 802 are connected with the second scanning lines $g_1, g_2 \ldots g_M$, the first terminals are connected with the second data lines $a_1, a_2 \ldots a_N$, and the second terminals are correspondingly connected with the second electrodes 82.

The display driving unit 711 includes a scanning line driving circuit 7111 connected with the second scanning lines $g_1, g_2 \ldots g_M$ and configured to send a scanning driving signal to the second scanning lines $g_1, g_2 \ldots g_M$ to switch on the second control switches 802. The display driving unit 711 further includes a data line driving circuit 7112 connected with the second data lines $a_1, a_2 \ldots a_N$ and configured to send display signals to the second data lines $a_1, a_2 \ldots a_N$, and the second control switches 802 which are switched on may transmit the display signals to the second electrodes 82.

Specifically, the display device may be a liquid crystal display device, and the second electrodes 82 are pixel electrodes. Each second electrode 82 and a common electrode serve as two polar plates of one sub-pixel unit in the display panel 70. The display signals may be pixel voltages, and a common voltage VCOM is applied to the common electrode. Liquid crystal molecules of sub-pixel units are deflected based on voltage differences between the pixel voltages and the common voltage VCOM, to implement the image display.

In other embodiments, the display device may be a plasma display device, an organic electroluminescence display device or the like. The first control switches 801 and the second control switches 802 may be thin film transistors (TFT), or may be control switches of other structures.

In the display device according to the embodiment, the first electrodes are independent from the second electrodes, thereby reducing the mutual interference between the image display and the fingerprint sensing. In addition, the first electrodes and the second electrodes may be driven by different driving units respectively, thereby simplifying the driving circuit.

Correspondingly, for solving the technical problem, a method for driving a display device is further provided according to the disclosure. For more clearly describing the technical solution of the method, steps of the method may be illustrated in detail in conjunction with the embodiments of the display device.

Reference may be made to FIGS. 3, 4 and 5. A display panel 10 includes a plurality of display electrodes 300 for displaying images. The display electrodes 300 located at the predetermined region 101 of the display panel 10 are defined as first electrodes 3011, the first electrodes 3011 are further configured for fingerprint sensing, and a stage during which the first electrodes 3011 perform the fingerprint sensing is defined as a fingerprint sensing stage.

The method includes: providing display signals to the display electrodes 300 to display the images; and providing a fingerprint sensing signal to the first electrodes 3011 and performing a self-capacitance detection on the first electrodes 3011 during the fingerprint sensing stage, to implement the fingerprint sensing.

Specifically, the fingerprint sensing stage may be triggered by a fingerprint sensing instruction, or may be triggered when turning on the electronic apparatus, or may be triggered after the electronic apparatus performs image display.

If the fingerprint sensing stage is triggered after the electronic apparatus performs the image display, the fingerprint sensing signal is provided instead of the display signals during the fingerprint sensing stage, and the self-capacitance detection is performed on the first electrodes 3011 to implement the fingerprint sensing.

The display panel 10 is further provided with scanning lines 400 arranged in rows, data lines 500 arranged in columns, and control switches 100 connected with the scanning lines 400 and the data lines 500. Each control switch 100 includes a control terminal g, a first terminal s and a second terminal d. The control terminal g is configured to control whether a signal can be transmittable between the first terminal s and the second terminal d. The control terminals g of the control switches 100 are connected with the scanning lines 400, the first terminals s are connected with the data lines 500, and the second terminals d are correspondingly connected with the display electrodes 300.

The process of providing the display signals to the display electrodes 300 to display the images includes:

sending scanning driving signals $G_1, G_2 \ldots G_N$ to the scanning lines 400 to switch on the control switches 100; and sending display signals $S_1 \ldots S_N$ to the data lines 500, and transmitting the display signals $S_1 \ldots S_N$ to the display electrodes 300 through the control switches 100 that are switched on.

Specifically, each sub-pixel unit includes one display electrode 300 and the control switch 100 connected with the display electrode 300. The sub-pixel units including the first electrodes 3011 are defined as first sub-pixel units 301, and other sub-pixel units are defined as second sub-pixel units 302. The control switch 100 in each first sub-pixel unit 301 is defined as a first control switch 3012. The display electrode 300 in each second sub-pixel unit 302 is defined as a second electrode 3021, and the control switch 100 in each second sub-pixel unit 302 is defined as a second control switch 3022. The scanning lines 400 connected with the first sub-pixel units 301 are defined as first scanning lines 401, and the scanning lines connected with the second sub-pixel units 302 but not connected with the first sub-pixel units 301 are defined as second scanning lines 402. The data lines 500 connected with the first sub-pixel units 301 are defined as first data lines 501, and the data lines 500 connected with the second sub-pixel units 302 but not connected with the first sub-pixel units 301 are defined as second data lines 502.

The process of providing the fingerprint sensing signal to the first electrodes 3011 and performing a self-capacitance detection on the first electrodes 3011 during the fingerprint sensing stage, to implement the fingerprint sensing includes:

providing a fingerprint sensing control signal C to switch on the first control switches 3012; and providing a fingerprint sensing signal D, and transmitting the fingerprint sensing signal D to the first electrodes 3011 through the first control switches 3012 that are switched on, to perform the fingerprint sensing.

The process of providing the fingerprint sensing signal to the first electrodes 3011 and performing the self-capacitance detection on the first electrodes 3011 during the fingerprint sensing stage, to implement the fingerprint sensing includes: controlling the second control switches 3022 connected with the second scanning lines 402 to be switched off during the fingerprint sensing stage. In this way, the pixel voltages on the second electrodes 3021 connected with the second scanning lines 402 remain unchanged. In addition, the common voltage on the common electrode 600 remains unchanged. Therefore, deflection angles of the liquid crystal molecules within the second sub-pixel units 302 located outside the predetermined region 101 may remain unchanged. Thereafter, the process further includes: sending the fingerprint sensing control signal C to the first scanning lines 401 to switch on the first control switches 3012, and controlling the fingerprint sensing detection circuit 206 to send the fingerprint sensing signal D to the first data lines 501.

As shown in FIGS. 4 and 5, the predetermined region 101 is a rectangular region located at a lower portion of the display panel 10. In the display panel 10, in addition to the second sub-pixel units 302 located at an upper portion of the display panel 10 above the predetermined region 101, a plurality of second sub-pixel units 302 are located on both sides of the predetermined region 101. The second sub-pixel units 302 located on both sides of the predetermined region 101 of the display panel 10 are connected with the first scanning lines 401 and the second data lines 502.

In a case that the fingerprint sensing control circuit 205 sends the fingerprint sensing control signal C to the first scanning lines 401, both the first control switches 3012 located within the predetermined region 101 and the second control switches 3022 of the second sub-pixel units 302 connected with the first scanning lines 401 are switched on. The method further includes: sending the display signals to the second data lines 502, and transmitting the display signals to the second electrodes of the second sub-pixel units 302 connected with the first scanning lines 401.

As shown in FIGS. 4 and 5, the display panel 10 includes a plurality of first sub-pixel units 301 located within the predetermined region 101 and a plurality of second sub-pixel units 302 located outside the predetermined region 101. The first sub-pixel units 301 include first red sub-pixel units, first green sub-pixel units and first blue sub-pixel units. The second sub-pixel units 302 include second red sub-pixel units, second green sub-pixel units and second blue sub-pixel units.

Specifically, the process of providing the fingerprint sensing signal to the first electrodes 3011 and performing a self-capacitance detection on the first electrodes 3011 during the fingerprint sensing stage, to implement the fingerprint sensing includes: performing the fingerprint sensing on the first sub-pixel units 301 in the display panel simultaneously, to improve the efficiency in fingerprint sensing and simplify the fingerprint sensing detection circuit 206.

However, it is not limited thereto in the disclosure. In other embodiment, the fingerprint sensing may be performed on only one first sub-pixel unit 301, to improve the accuracy of fingerprint sensing.

In the display panel 10, one pixel unit at least includes one red sub-pixel unit (R), one green sub-pixel unit (G) and one blue sub-pixel unit (B). Some of the pixel units may also include other sub-pixel units such as a white sub-pixel unit. Specifically, the pixel units located within the predetermined region 101 and configured to implement the fingerprint sensing and the image display are defined as first pixel units. Each first pixel unit includes one first red sub-pixel unit, one first green sub-pixel unit and one first blue sub-pixel unit. The pixel units located outside the predetermined region 101 are defined as second pixel units, and each second pixel unit includes one second red sub-pixel unit, one second green sub-pixel unit and one second blue sub-pixel unit.

Optionally, the process of providing the fingerprint sensing signal to the first electrodes 3011 and performing the self-capacitance detection on the first electrodes 3011 during the fingerprint sensing stage, to implement the fingerprint sensing includes: performing the fingerprint sensing on all sub-pixel units of one first pixel unit simultaneously. Hence, the efficiency in fingerprint sensing is improved, and it is easier to control.

In the display device as shown in FIGS. 11 and 12, first control switches 3112 and second control switches 3122 in a display panel of the display device are poly-silicon thin film transistors. The first control switch 3112 of the first red sub-pixel unit R, the first control switch 3112 of the first green sub-pixel unit G and the first control switch 3112 of the first blue sub-pixel unit B in the first pixel unit 311 located at the predetermined region 101 are connected with different first scanning lines 411 respectively and are connected with an identical first data line 511.

The process of providing the fingerprint sensing signal to the first electrodes 3011 and performing the self-capacitance detection on the first electrodes 3011 during the fingerprint sensing stage, to implement the fingerprint sensing includes:

providing the fingerprint sensing control signal C simultaneously to three first scanning lines 411 respectively connected with the first red sub-pixel unit R, the first green sub-pixel unit G and the first blue sub-pixel unit B in one first pixel unit 311, to simultaneously switch on the first control switch 3112 of the first red sub-pixel unit R, the first control switch 3112 of the first green sub-pixel unit G and the first control switch 3112 of the first blue sub-pixel unit B in the first pixel unit 311, and providing the fingerprint sensing signal D for performing the self-capacitance detection to the first red sub-pixel unit R, the first green sub-pixel unit G and the first blue sub-pixel unit B in the first pixel unit 311 via the first data line 511.

Optionally, as shown in FIG. 12, the fingerprint sensing control signal C is a pulse signal having the same frequency, the same phase and the same amplitude as the fingerprint sensing signal D, thereby switching on the first control switches 3112 during the fingerprint sensing and further reducing electric quantities in charging and discharging capacitors formed by the first scanning lines 411 and the first electrodes 3111.

However, it is not limited thereto in the disclosure. In other embodiments, the fingerprint sensing control signal C may be a pulse signal having the same frequency and the same phase as the fingerprint sensing signal D, the first control switches 3112 may also be switched on during the fingerprint sensing and the electric quantities in charging and discharging the capacitors formed by the first scanning lines 411 and the first electrodes 3111 may also be reduced. Alternatively, the fingerprint sensing control signal C may be identical with a scanning driving signal, and the first control switches 3112 of the first red sub-pixel unit R, the first green sub-pixel unit G and the first blue sub-pixel unit B in one first pixel unit 311 may also simultaneously switched on.

Reference may be made to FIGS. 4, 5 and 12. A common electrode 600 opposite to the pixel electrodes is further provided on the display panel 10. The common electrode 600 and each display electrode (specifically the pixel electrode) serve as two polar plates of one sub-pixel unit in the display panel 10.

The display signals $S_1 \ldots S_N$ are pixel voltages. The process of providing the display signals to the display electrodes 300 to implement the image display includes: providing a common voltage VCOM to the common electrode 600. Deflections of liquid crystal molecules in the sub-pixel unit are determined by the pixel voltage and the common voltage VCOM on the sub-pixel unit, thereby determining the light transmittance of the sub-pixel unit, and the image display is implemented in combination with the color of a color filter.

The common electrode 600 is generally disposed opposite to the display electrodes 300, thereby easily resulting in parasitic capacitances. Optionally, the providing a fingerprint sensing signal to the first electrode 3011 and performing a self-capacitance detection on the first electrode 3011 during the fingerprint sensing stage to implement the fingerprint sensing includes: providing a first signal N1 to the common electrode 600, for reducing the electric quantities in charging and discharging the capacitors formed by the first electrodes 3011 and the common electrode 600 during the fingerprint sensing.

As shown in FIG. 6, the first signal N1 is identical with the fingerprint sensing signal D, and both of them are square-wave pulse signals with a low level of 0V and a high level of 2V. The potential difference between the common electrode applied with the first signal N1 and the first electrode 3011 applied with the fingerprint sensing signal D remains unchanged, and charging and discharging the capacitors formed by the first electrodes 3011 and the common electrode 600 substantially does not occur during the fingerprint sensing stage. However, whether the first signal N1 is identical with the fingerprint sensing signal D is not limited in the disclosure. In other embodiments, the first signal N1 may be a pulse signal having the same frequency and the same phase as the fingerprint sensing signal or a pulse signal having the same frequency, the same phase and the same amplitude as the fingerprint sensing signal, here the electric quantities in charging and discharging the capacitors formed by the first electrode 3011 and the common electrode 600 may also be reduced during the fingerprint sensing stage.

As shown in FIG. 14, the display device further includes a touch-sensitive unit 50 stacked on a display panel 40. For example, the touch-sensitive unit 50 is an out-cell touch-sensitive unit. Alternatively, the touch-sensitive unit 50 is a part of the display panel 40. For example, the touch-sensitive unit 50 is an on cell touch-sensitive unit or an in-cell touch-sensitive unit.

The method further includes: performing a touch detection on the touch-sensitive unit 50, and driving an image display stage, a touch detection stage and the fingerprint sensing stage in a time division mode. A stage during which the first electrodes 3011 perform the image display is defined as the image display stage.

Optionally, as shown in FIG. 15, a plurality of common electrodes 601 are disposed in the display panel. The common electrodes 601 may provide a common voltage VCOM to sub-pixel units during the image display stage, and may serve as self-capacitive electrodes for the touch detection.

In the method, the process of performing the touch detection on the touch-sensitive unit 50 includes: providing a self-capacitive touch detection signal to the common electrodes 601.

For improving the accuracy of touch detection, as shown in FIG. 16, the process of providing the self-capacitive touch detection signal to the common electrode includes: providing a second signal N2 to the first scanning lines 401 and the second scanning lines 402, where with the second signal N2, the control switches may be controlled to be in a switched-off state, and the electric quantities in charging and discharging capacitors formed by the common electrode and the first scanning lines 401 and the electric quantities in charging and discharging capacitors formed by the common electrode and the second scanning lines 402 may be reduced.

Reference may be made to FIGS. 4 and 16. The control switch is an N-type TFT, the touch detection signal T is a square-wave pulse signal with a low level of 0V and a high level of 2V, and the second signal N2 is a pulse signal with a high level of −10V and a low level of −12V, which has the same frequency, the same phase and the same amplitude as the touch detection signal T (the amplitude is 2V for both the second signal N2 and the touch detection signal T). The level of −10V or −12V may lead to cut-off of the N-type TFT. Since voltage differences between polar plates of capacitors formed by the common electrode 600 and the first scanning lines 401 (or the second scanning lines 402) are zero, the electric quantities in charging and discharging the capacitors formed by the common electrode 600 and the first scanning lines 401 and the electric quantities in charging and discharging the capacitors formed by the common electrode 600 and the second scanning lines 402 may be reduced during the touch detection stage. Therefore, parasitic capacitances between the common electrode and the first scanning lines 401 and parasitic capacitances between the common electrode and the second scanning lines 402 may be reduced, leading to an improvement of the accuracy of a self-capacitive touch detection.

It should be noted that, it is illustrated here by taking the case that the second signal N2 is a pulse signal having the same frequency, the same phase and the same amplitude as the touch detection signal T as an example, but it is not limited thereto in the disclosure. The second signal N2 may be a pulse signal having the same frequency and the same phase as the touch detection signal T, and the electric quantities in charging and discharging the capacitors may also be reduced as long as the voltage across each capacitor is reduced.

Optionally, the process of providing the self-capacitive touch detection signal to the common electrode 600 includes: providing a third signal N3 to the first data lines 501 and the second data lines 502. With the third signal, the electric quantities in charging and discharging capacitors formed by the common electrode 600 and the first data lines 501 and the electric quantities in charging and discharging capacitors formed by the common electrode 600 and the second data lines 502 may be reduced.

Reference may be made to FIGS. 4 and 16. The touch detection signal T is a square-wave pulse signal with a low level of 0V and a high level of 2V, and the third signal N3 is also a square-wave pulse signal with a low level of 0V and a high level of 2V. Since the third signal N3 is identical with the touch detection signal T, the voltage differences between the polar plates of the capacitors formed by the common electrode 600 and the first data lines 501 (or the second data lines 502) may maintain unchanged. Therefore, the electric quantities in charging and discharging the capacitors formed by the common electrode 600 and the first data lines 501 and the electric quantities in charging and discharging the capacitors formed by the common electrode 600 and the second data lines 502 may be reduced during the touch detection stage. Accordingly, parasitic capacitances between the common electrode 600 and the first data lines 501 and parasitic capacitances between the common electrode 600 and the second data lines 502 may be reduced, thereby improving the accuracy of the self-capacitive touch detection.

It should be noted that, it is illustrated here by taking the case that the third signal N3 is identical with the touch detection signal T as an example, but it is not limited thereto in the disclosure. The third signal N3 may be a pulse signal having the same frequency, the same phase and the same amplitude as the touch detection signal T, and the voltage difference between the two polar plates of each capacitor formed by the common electrode 600 and the first data line 501 and the voltage difference between the two polar plates of each capacitor formed by the common electrode 600 and the second data line 502 are zero. Alternatively, the third signal N3 may be a pulse signal having the same frequency and the same phase as the touch detection signal T, and the electric quantities in charging and discharging the capacitors may also be reduced if the voltage difference between the two polar plates of each capacitor formed by the common electrode 600 and the first data line 501 and the voltage difference between the two polar plates of each capacitor formed by the common electrode 600 and the second data line 502 are reduced.

Reference may be made to FIGS. 3 and 17. The method according to the disclosure further includes: providing display signals corresponding to the fingerprint information to the display electrodes 300 after a completion of the fingerprint sensing or when performing the fingerprint sensing, to display the fingerprint image. By displaying the fingerprint image on the display panel 10, a user can clearly know a position where his finger touches in the predetermined region 101, thereby leading to an accurate and complete fingerprint sensing for the fingerprint. With the method for driving the display device provided in the disclosure, the display device may implement image display and the fingerprint sensing, thereby improving the security and the integration level of the display device.

Furthermore, with the method for driving the display device provided in the disclosure, the display device may be integrated with a touch detection function, thereby further improving the security and the integration level of the display device.

Correspondingly, for solving the technical problem, a liquid crystal display device is further provided according to the disclosure. The related contents of the liquid crystal display device may be referred to the embodiments of the display device, which are not repeated here. The liquid crystal display device according to the disclosure has a high integration level, thereby improving the security and privacy of the liquid crystal display device.

Although being described as above, the disclosure is not limited thereto. Any one of those skilled in the art can make various variations and modifications without departing from the spirit and scope of the disclosure. Therefore, the scope of protection of the disclosure should be subject to the scope defined by the claims.

The invention claimed is:

1. A display device, comprising:
a display panel provided with a plurality of display electrodes, the display electrodes configured to display images, wherein the display electrodes located within a predetermined region of the display panel are defined as first electrodes, the first electrodes are further configured to implement a fingerprint sensing, and a stage during which the first electrodes perform the fingerprint sensing is defined as a fingerprint sensing stage, wherein a stage during which the first electrodes perform image display is defined as an image display stage, the display panel is further provided with a common electrode, and the common electrode and each display electrode serve as two polar plates of one sub-pixel unit in the display panel; and
a driving circuit comprising:
a common voltage generation circuit connected with the common electrode and configured to provide a common voltage to the common electrode, wherein the two polar plates of each sub-pixel unit are applied with the common voltage and a display signal in the form of a pixel voltage respectively, to display the images; and
a first signal generation circuit connected with the common electrode and configured to provide a first signal, wherein the driving circuit is configured to:
provide the display signals to the display electrodes to display the images, provide a fingerprint sensing signal to the first electrodes and perform a self-capacitance detection on the first electrodes during the fingerprint sensing stage, to implement the fingerprint sensing, and
control the common voltage generation circuit to provide the common voltage to the common electrode during the image display stage; and control the first signal generation circuit to provide the first signal to the common electrode during the fingerprint sensing stage, for reducing electric quantities in charging and discharging capacitors formed by the first electrodes and the common electrode during the fingerprint sensing.

2. The display device according to claim 1, wherein the driving circuit is configured to:
provide the display signals to the display electrodes to display the images;
provide the fingerprint sensing signal to the first electrodes and perform the self-capacitance detection on the first electrodes, to implement the fingerprint sensing; and
provide the fingerprint sensing signal to the first electrodes to perform the fingerprint sensing during the fingerprint sensing stage.

3. The display device according to claim 2, wherein
the display panel is further provided with scanning lines arranged in rows, data lines arranged in columns, and control switches connected with the scanning lines and the data lines, each control switch comprises a control terminal, a first terminal, and a second terminal, the control terminal being configured to control whether a signal is transmittable between the first terminal and the second terminal, the control terminals of the control switches are connected with the scanning lines, the first terminals are connected with the data lines, and the second terminals are correspondingly connected with the display electrodes;
the display device further comprises a scanning line driving circuit connected with the scanning lines and configured to send a scanning driving signal to the scanning lines to switch on the control switches; and
the driving circuit comprises a data line driving circuit connected with the data lines and configured to send the display signals to the data lines, and the data lines transmit the display signals to the display electrodes via the control switches that are switched on.

4. The display device according to claim 3, wherein
each sub-pixel unit comprises one display electrode and the control switch connected with the display electrode, the sub-pixel units comprising the first electrodes are defined as first sub-pixel units and other sub-pixel units are defined as second sub-pixel units, the control switch in each first sub-pixel unit is defined as a first control switch, the control switch in each second sub-pixel unit is defined as a second control switch, the scanning lines connected with the first sub-pixel units are defined as first scanning lines, the scanning lines connected with the second sub-pixel units but not connected with the first sub-pixel units are defined as second scanning lines, the data lines connected with the first sub-pixel units are defined as first data lines, and the data lines connected with the second sub-pixel units but not connected with the first sub-pixel units are defined as second data lines;
the driving circuit comprises:
a fingerprint sensing control circuit connected with the first scanning lines and configured to provide a fingerprint sensing control signal to switch on the first control switches; and
a fingerprint sensing detection circuit connected with the first data lines and configured to provide the fingerprint sensing signal to the first electrodes via the first control switches which are switched on, to perform the fingerprint sensing; and
the driving circuit is configured to control the fingerprint sensing control circuit to send the fingerprint sensing control signal to the first scanning lines to switch on the first control switches, and control the fingerprint sensing detection circuit to send the fingerprint sensing signal to the first data lines, during the fingerprint sensing stage.

5. The display device according to claim 4, wherein the display electrodes of the second sub-pixel units are defined as second electrodes;
the driving circuit is configured to control the second control switches connected with the second scanning lines to be switched off during the fingerprint sensing stage, control the fingerprint sensing control circuit to send the fingerprint sensing control signal to the first scanning lines to switch on the first control switches, and control the fingerprint sensing detection circuit to send the fingerprint sensing signal to the first data lines.

6. The display device according to claim 5, wherein the display panel comprises a plurality of second sub-pixel units connected with the first scanning lines and the second data lines;
the second control switches of the second sub-pixel units connected with the first scanning lines are switched on when the fingerprint sensing control circuit sends the fingerprint sensing control signal to the first scanning lines; and the driving circuit is further configured to control the data line driving circuit to send the display signals to the second data lines, and the second data lines transmit the display signals to the second electrodes of the second sub-pixel units connected with the first scanning lines.

7. The display device according to claim 4, wherein the fingerprint sensing detection circuit is configured to perform the fingerprint sensing on one first sub-pixel unit in the display panel, or is configured to perform the fingerprint sensing on more than one first sub-pixel unit in the display panel simultaneously.

8. The display device according to claim 7, wherein the display panel comprises a plurality of the first sub-pixel units and a plurality of the second sub-pixel units, the first sub-pixel units comprise first red sub-pixel units, first green sub-pixel units, and first blue sub-pixel units, and the second sub-pixel units comprise second red sub-pixel units, second green sub-pixel units, and second blue sub-pixel units;

the display panel comprises first pixel units and second pixel units, the first pixel units are located within the predetermined region and are configured to implement the fingerprint sensing and image display, each first pixel unit comprises one first red sub-pixel unit, one first green sub-pixel unit and one first blue sub-pixel unit, and each second pixel unit comprises one second red sub-pixel unit, one second green sub-pixel unit and one second blue sub-pixel unit; and the fingerprint sensing detection circuit is configured to perform the fingerprint sensing on all sub-pixel units of one first pixel unit simultaneously.

9. The display device according to claim 8, wherein the first control switches and the second control switches are poly-silicon thin film transistors, the first control switches of the first red sub-pixel unit, the first green sub-pixel unit and the first blue sub-pixel unit in one first pixel unit are connected with different first scanning lines respectively and connected with an identical first data line;

the fingerprint sensing control circuit provides the fingerprint sensing control signal simultaneously to three first scanning lines respectively connected with the first red sub-pixel unit, the first green sub-pixel unit and the first blue sub-pixel unit in one first pixel unit, to simultaneously switch on the first control switches of the first red sub-pixel unit, the first green sub-pixel unit and the first blue sub-pixel unit in the one first pixel unit; and the fingerprint sensing detection circuit provides the fingerprint sensing signal to the first red sub-pixel unit, the first green sub-pixel unit and the first blue sub-pixel unit in the one first pixel unit via the identical first data line.

10. The display device according to claim 7, wherein the fingerprint sensing detection circuit comprises:
an operational amplifier;
a reference voltage source connected with a non-inverting input terminal of the operational amplifier and configured to provide a reference voltage;
a feedback capacitor having one plate connected to an inverting input terminal of the operational amplifier and the other plate connected to an output terminal of the operational amplifier;
a first switch having one terminal connected to the first data line and the other terminal connected to a first voltage source for outputting a first voltage, wherein a first node is defined between the first switch and the first data line, and the first voltage is greater than or smaller than the reference voltage;
a second switch having one terminal connected to the first node and the other terminal connected to the inverting input terminal of the operational amplifier;
a third switch connected in parallel with the feedback capacitor; and
a controller configured to output a first control signal and a second control signal in a time division mode, wherein the first control signal is configured to switch on the first switch and the third switch and to switch off the second switch, and the second control signal is configured to switch on the second switch and to switch off the first switch and the third switch.

11. The display device according to claim 10, wherein the reference voltage is 2V, and the first voltage is 0V or 12V.

12. The display device according to claim 4, wherein the fingerprint sensing control signal is a pulse signal having the same frequency and the same phase as the fingerprint sensing signal, and is for switching on the first control switches during the fingerprint sensing and reducing electric quantities in charging and discharging capacitors formed by the first scanning lines and the first electrodes;

or the fingerprint sensing control signal is a pulse signal having the same frequency, the same phase and the same amplitude as the fingerprint sensing signal, and is for switching on the first control switches during the fingerprint sensing and reducing electric quantities in charging and discharging capacitors formed by the first scanning lines and the first electrodes.

13. The display device according to claim 4, wherein:
one fourth switch is provided between each first data line and the data line driving circuit, and one fifth switch is provided between each first data line and the fingerprint sensing detection circuit; and
the driving circuit is configured to control the fourth switches to be switched on and the fifth switches to be switched off during the image display stage, and control the fifth switches to be switched on and the fourth switches to be switched off during the fingerprint sensing stage.

14. The display device according to claim 4, wherein the first signal is a pulse signal having the same frequency and the same phase as the fingerprint sensing signal, or the first signal is a pulse signal having the same frequency, the same phase, and the same amplitude as the fingerprint sensing signal.

15. The display device according to claim 4, wherein the first signal generation circuit is integrated in the fingerprint sensing detection circuit.

16. The display device according to claim 15, wherein a sixth switch is provided between the common voltage generation circuit and the common electrode, and a seventh switch is provided between the fingerprint sensing detection circuit and the common electrode; and
the driving circuit controls the sixth switch to be switched on and the seventh switch to be switched off during the image display stage, and controls the seventh switch to be switched on and the sixth switch to be switched off during the fingerprint sensing stage.

17. The display device according to claim 15, wherein the fingerprint sensing detection circuit comprises a plurality of fingerprint sensing detection modules, each fingerprint sensing detection module is configured to perform the fingerprint sensing on one first sub-pixel unit or is configured to perform the fingerprint sensing on more than one first sub-pixel unit simultaneously, and the fingerprint sensing detection module is configured to output the fingerprint sensing signal and output the first signal;

the fingerprint sensing detection module comprises:

an operational amplifier;

a reference voltage source connected with a non-inverting input terminal of the operational amplifier and configured to provide a reference voltage;

a feedback capacitor having one plate connected to an inverting input terminal of the operational amplifier and the other terminal connected to an output terminal of the operational amplifier;

a first switch having one terminal connected to the first data line and the other terminal connected to a first voltage source for outputting a first voltage, wherein a first node is defined between the first switch and the first data line;

a second switch having one terminal connected to the first node and the other terminal connected to the inverting input terminal of the operational amplifier;

an eighth switch having one terminal connected to the common electrode and the other terminal connected to a second voltage source for outputting a second voltage, wherein a second node is defined between the eighth switch and the common electrode, and both the first voltage and the second voltage are smaller than or greater than the reference voltage;

a ninth switch having one terminal connected to the second node and the other terminal connected to the reference voltage source;

a third switch connected in parallel with the feedback capacitor; and a controller configured to output a third control signal and a fourth control signal in a time division mode, wherein the third control signal is configured to switch on the first switch, the eighth switch and the third switch and to switch off the second switch and the ninth switch, and the fourth control signal is configured to switch on the second switch and the ninth switch and to switch off the first switch, the eighth switch and the third switch.

18. The display device according to claim 4, wherein:

the display device further comprises a touch-sensitive unit, the touch-sensitive unit being stacked on the display panel or being a part of the display panel;

the driving circuit further comprises a touch driving circuit configured to perform a touch detection on the touch-sensitive unit; and the driving circuit is connected with the touch driving circuit, and is configured to control the image display, the touch detection, and the fingerprint sensing in a time division mode, to implement the image display stage, a touch detection stage, and the fingerprint sensing stage respectively.

19. The display device according to claim 18, wherein the common electrode serves as a self-capacitive electrode for the touch detection; and the touch driving circuit is connected with the common electrode and is configured to provide a self-capacitive touch detection signal to the common electrode.

20. The display device according to claim 19, wherein a sixth switch is provided between the common electrodes and the common voltage generation circuit, a seventh switch is provided between the fingerprint sensing detection circuit and the common electrodes, and a tenth switch is provided between the common electrodes and the touch driving circuit; and the driving circuit is configured to control the sixth switch to be switched on and the seventh switch and the tenth switch to be switched off during the image display stage, control the tenth switch to be switched on and the sixth switch and the seventh switch to be switched off during the touch detection stage, and control the seventh switch to be switched on and the sixth switch and the tenth switch to be switched off during the fingerprint sensing stage.

21. The display device according to claim 19, wherein the driving circuit further comprises a second signal generation circuit connected with the first scanning lines and the second scanning lines and configured to provide a second signal; and the driving circuit is configured to control the second signal generation circuit to provide the second signal to the first scanning lines and the second scanning lines during the touch detection, the control switches are controlled to be in a switched-off state due to the second signal, and electric quantities in charging and discharging capacitors formed by the common electrodes and the first scanning lines, and electric quantities in charging and discharging capacitors formed by the common electrodes and the second scanning lines are reduced due to the second signal.

22. The display device according to claim 21, wherein the second signal is a pulse signal having the same frequency and the same phase as the touch detection signal, or the second signal is a pulse signal having the same frequency, the same phase, and the same amplitude as the touch detection signal.

23. The display device according to claim 19, wherein the driving circuit further comprises a third signal generation circuit connected with the first data lines and the second data lines and configured to provide a third signal; and the driving circuit is configured to control the third signal generation circuit to provide the third signal to the first data lines and the second data lines during the touch detection, electric quantities in charging and discharging capacitors formed by the common electrodes and the first data lines and electric quantities in charging and discharging capacitors formed by the common electrodes and the second data lines are reduced due to the third signal.

24. The display device according to claim 23, wherein the third signal is a pulse signal having the same frequency and the same phase as the touch detection signal, or the third signal is a pulse signal having the same frequency, the same phase, and the same amplitude as the touch detection signal.

25. The display device according to claim 2, wherein the driving circuit is further configured to provide the display signals corresponding to fingerprint information to the display electrodes, to display a fingerprint image, after the driving circuit completes the fingerprint sensing or when the driving circuit performs the fingerprint sensing.

26. The display device according to claim 1, wherein the display panel is an In-Plane Switching liquid crystal display panel.

27. The display device according to claim 1, wherein the driving circuit provides a periodically-varying fingerprint sensing signal to the first electrodes to perform the self-capacitance detection on the first electrodes, to implement the fingerprint sensing.

28. The display device according to claim 1, wherein the driving circuit is connected with the display electrodes, and the driving circuit is configured to:

provide the display signals to the display electrodes to display the images;

provide the fingerprint sensing signal to the first electrodes and perform the self-capacitance detection on the first electrodes, to implement the fingerprint sensing; and provide the fingerprint sensing signal to the first electrodes to perform the fingerprint sensing, and stop outputting the display signals to the first electrodes or disconnect from the first electrodes to stop outputting the display signals to the first electrodes, during the fingerprint sensing stage.

29. The display device according to claim 28, wherein the driving circuit outputs the display signals to the first electrodes to perform the image display, and stops outputting the fingerprint sensing signal to the first electrodes or disconnects from the first electrodes to stop outputting the fingerprint sensing signal to the first electrodes, during the image display stage.

30. An electronic apparatus, comprising the display device according to claim 1.

31. The electronic apparatus according to claim 30, further comprising:
a fingerprint sensing instruction circuit configured to trigger the fingerprint sensing stage of the display device; and
a turning-on device, an application device and a touch detection device, wherein the fingerprint sensing instruction circuit is disposed in any one or any combination of the turning-on device, the application device and the touch detection device.

32. A display device, comprising:
a display panel provided with a plurality of display electrodes, the display electrodes located within a predetermined region of the display panel are defined as first electrodes and a plurality of display electrodes located outside the predetermined region are defined as the second electrodes wherein a stage during which the first electrodes perform image display is define as an image display stage, the display panel is further provided with a common electrode, and the common electrode and each display electrode serve as two polar plates of one sub-pixel unit in the display panel; and
a driving circuit comprising:
a common voltage generation circuit connected with the common electrode and configured to provide a common voltage to the common electrode, wherein the two polar plates of each sub-pixel unit are applied with the common voltage and a display signal in the form of a pixel voltage respectively, to display images; and
a first signal generation circuit connected with the common electrode and configured to provide a first signal, wherein the driving circuit is configured to:
provide a fingerprint sensing signal to the first electrodes and perform a self-capacitance detection on the first electrodes, to implement a fingerprint sensing, and provide the display signals to the second electrodes to display the images, and
control the common voltage generation circuit to provide the common voltage to the common electrode during the image display stage; and control the first signal generation circuit to provide the first signal to the common electrode during the fingerprint sensing stage, for reducing electric quantities in charging and discharging capacitors formed by the first electrodes and the common electrode during the fingerprint sensing.

33. The display device according to claim 32, wherein the driving circuit is configured to:

provide the display signals to the second electrodes to display the images; and
provide the fingerprint sensing signal to the first electrodes and perform the self-capacitance detection on the first electrodes, to implement the fingerprint sensing.

34. The display device according to claim 33, wherein
the display panel is provided with first scanning lines arranged in rows, first data lines arranged in columns, and first control switches connected with the first scanning lines and the first data lines, each first control switch comprises a control terminal, a first terminal, and a second terminal, the control terminal being configured to control whether a signal is transmittable between the first terminal and the second terminal, the control terminals of the first control switches are connected with the first scanning lines, the first terminals are connected with the first data lines, and the second terminals are correspondingly connected with the first electrodes; and
the driving circuit comprises:
a fingerprint sensing control circuit connected with the first scanning lines and configured to provide a fingerprint sensing control signal to switch on the first control switches; and
a fingerprint sensing detection circuit connected with the first data lines and configured to provide the fingerprint sensing signal to the first electrodes via the first control switches that are switched on, to perform the fingerprint sensing.

35. The display device according to claim 33, wherein
the display panel is further provided with second scanning lines arranged in rows, second data lines arranged in columns, and second control switches connected with the second scanning lines and the second data lines, each second control switch comprises a control terminal, a first terminal, and a second terminal, the control terminal being configured to control whether a signal is transmittable between the first terminal and the second terminal, the control terminals of the second control switches are connected with the second scanning lines, the first terminals are connected with the second data lines, and the second terminals are correspondingly connected with the second electrodes; and
the driving circuit is connected with the second scanning lines and the second data lines, and the driving circuit is configured to
send a scanning driving signal to the second scanning lines to switch on the second control switches; and
send the display signals to the second data lines, wherein the data lines transmit the display signals to the second electrodes via the second control switches that are switched on.

36. The display device according to claim 32, wherein the display panel is an In-Plane Switching liquid crystal display panel.

37. A driving circuit for a display device, wherein the display device comprises a display panel provided with a plurality of display electrodes, the display electrodes are configured to display images, the display electrodes located within a predetermined region of the display panel are defined as first electrodes, the first electrodes are configured to implement a fingerprint sensing, and a stage during which the first electrodes perform the fingerprint sensing is defined as a fingerprint sensing stage, wherein a stage during which the first electrodes perform image display is define as an image display stage, the display panel is further provided with a common electrode, and the common electrode and each display electrode serve as two polar plates of one sub-pixel unit in the display panel; and the driving circuit is configured to:
provide display signals to the display electrodes, to display the images wherein the display signals are pixel voltages;
provide a fingerprint sensing signal to the first electrodes and perform a self-capacitance detection on the first electrodes, to implement the fingerprint sensing; and
provide the fingerprint sensing signal to the first electrodes to perform the fingerprint sensing during the fingerprint sensing stage, wherein the driving circuit comprises:
a common voltage generation circuit connected with the common electrode and configured to provide a common voltage to the common electrode, wherein the two polar plates of each sub-pixel unit are applied with the common voltage and one of the pixel voltages respectively, to display the images; and
a first signal generation circuit connected with the common electrode and configured to provide a first signal, wherein the driving circuit is further configured to:
control the common voltage generation circuit to provide the common voltage to the common electrode during the image display stage; and control the first signal generation circuit to provide the first signal to the common electrode during the fingerprint sensing stage, for reducing electric quantities in charging and discharging capacitors formed by the first electrodes and the common electrode during the fingerprint sensing.

38. The driving circuit according to claim 37, wherein
the display panel is further provided with scanning lines arranged in rows, data lines arranged in columns, and control switches connected with the scanning lines and the data lines, each control switch comprises a control terminal, a first terminal and a second terminal, the control terminal being configured to control whether a signal is transmittable between the first terminal and the second terminal, the control terminals of the control switches are connected with the scanning lines, the first terminals are connected with the data lines, and the second terminals are correspondingly connected with the display electrodes;
the display device further comprises a scanning line driving circuit connected with the scanning lines and configured to send a scanning driving signal to the scanning lines to switch on the control switches; and
the driving circuit comprises a data line driving circuit connected with the data lines and configured to send the display signals to the data lines, and the data lines transmit the display signals to the display electrodes via the control switches that are switched.

39. The driving circuit according to claim 38, wherein
each sub-pixel unit comprises one display electrode and the control switch connected with the display electrode, the sub-pixel units comprising the first electrodes are defined as first sub-pixel units and other sub-pixel units are defined as second sub-pixel units, the control switch in each first sub-pixel unit is defined as a first control switch, the control switch in each second sub-pixel unit is defined as a second control switch, the scanning lines connected with the first sub-pixel units are defined as first scanning lines, the scanning lines connected with the second sub-pixel units but not connected with the first sub-pixel units are defined as second scanning lines, the data lines connected with the first sub-pixel units are defined as first data lines, and the data lines connected with the second sub-pixel units but not connected with the first sub-pixel units are defined as second data lines;

the driving circuit comprises:
a fingerprint sensing control circuit connected with the first scanning lines and configured to provide a fingerprint sensing control signal to switch on the first control switches; and
a fingerprint sensing detection circuit connected with the first data lines and configured to provide the fingerprint sensing signal to the first electrodes via the first control switches which are switched on, to perform the fingerprint sensing; and
the driving circuit is configured to control the fingerprint sensing control circuit to send the fingerprint sensing control signal to the first scanning lines to switch on the first control switches, and control the fingerprint sensing detection circuit to send the fingerprint sensing signal to the first data lines, during the fingerprint sensing stage.

40. The driving circuit according to claim 39, wherein the display electrodes of the second sub-pixel units are defined as second electrodes;
the driving circuit is configured to control the second control switches connected with the second scanning lines to be switched off during the fingerprint sensing stage, control the fingerprint sensing control circuit to send the fingerprint sensing control signal to the first scanning lines to switch on the first control switches, and control the fingerprint sensing detection circuit to send the fingerprint sensing signal to the first data lines.

41. The driving circuit according to claim 40, wherein the display panel comprises a plurality of second sub-pixel units connected with the first scanning lines and the second data lines;
the second control switches of the second sub-pixel units connected with the first scanning lines are switched on when the fingerprint sensing control circuit sends the fingerprint sensing control signal to the first scanning lines; and
the driving circuit is further configured to control the data line driving circuit to send the display signals to the second data lines, and the second data lines transmit the display signals to the second electrodes of the second sub-pixel units connected with the first scanning lines.

42. The driving circuit according to claim 41, wherein the fingerprint sensing control signal is a pulse signal having the same frequency and the same phase as the fingerprint sensing signal, and is for switching on the first control switches during the fingerprint sensing and reducing electric quantities in charging and discharging capacitors formed by the first scanning lines and the first electrodes;
or the fingerprint sensing control signal is a pulse signal having the same frequency, the same phase, and the same amplitude as the fingerprint sensing signal, and is for switching on the first control switches during the fingerprint sensing and reducing electric quantities in charging and discharging capacitors formed by the first scanning lines and the first electrodes.

43. The driving circuit according to claim 39, wherein the fingerprint sensing detection circuit is configured to perform the fingerprint sensing on one first sub-pixel unit in the display panel, or is configured to perform the fingerprint sensing on more than one first sub-pixel unit in the display panel simultaneously.

44. The driving circuit according to claim 43, wherein the display panel comprises a plurality of the first sub-pixel units and a plurality of the second sub-pixel units, the first sub-pixel units comprise first red sub-pixel units, first green sub-pixel units and first blue sub-pixel units, and the second sub-pixel units comprise second red sub-pixel units, second green sub-pixel units and second blue sub-pixel units;

the display panel comprises first pixel units and second pixel units, the first pixel units are located within the predetermined region and are configured to implement the fingerprint sensing and image display, each first pixel unit comprises one first red sub-pixel unit, one first green sub-pixel unit and one first blue sub-pixel unit, and each second pixel unit comprises one second red sub-pixel unit, one second green sub-pixel unit and one second blue sub-pixel unit; and the fingerprint sensing detection circuit is configured to perform the fingerprint sensing on all sub-pixel units of one first pixel unit simultaneously.

45. The driving circuit according to claim 44, wherein the first control switches and the second control switches are poly-silicon thin film transistors, the first control switches of the first red sub-pixel unit, the first green sub-pixel unit and the first blue sub-pixel unit in one first pixel unit are connected with different first scanning lines respectively and connected with an identical first data line;

the fingerprint sensing control circuit provides the fingerprint sensing control signal simultaneously to three first scanning lines respectively connected with the first red sub-pixel unit, the first green sub-pixel unit and the first blue sub-pixel unit in one first pixel unit, to simultaneously switch on the first control switches of the first red sub-pixel unit, the first green sub-pixel unit and the first blue sub-pixel unit in the one first pixel unit; and the fingerprint sensing detection circuit provides the fingerprint sensing signal to the first red sub-pixel unit, the first green sub-pixel unit and the first blue sub-pixel unit in the one first pixel unit via the identical first data line.

46. The driving circuit according to claim 43, wherein the fingerprint sensing detection circuit comprises:

an operational amplifier;

a reference voltage source connected with a non-inverting input terminal of the operational amplifier and configured to provide a reference voltage;

a feedback capacitor having one plate connected to an inverting input terminal of the operational amplifier and the other plate connected to an output terminal of the operational amplifier;

a first switch having one terminal connected to the first data line and the other terminal connected to a first voltage source for outputting a first voltage, wherein a first node is defined between the first switch and the first data line, and the first voltage is greater than or smaller than the reference voltage;

a second switch having one terminal connected to the first node and the other terminal connected to the inverting input terminal of the operational amplifier;

a third switch connected in parallel with the feedback capacitor; and a controller configured to output a first control signal and a second control signal in a time division mode, wherein the first control signal is configured to switch on the first switch and the third switch and to switch off the second switch, and the second control signal is configured to switch on the second switch and to switch off the first switch and the third switch.

47. The driving circuit according to claim 39, wherein:

one fourth switch is provided between each first data line and the data line driving circuit, and one fifth switch is provided between each first data line and the fingerprint sensing detection circuit; and the driving circuit is configured to, control the fourth switches to be switched on and the fifth switches to be switched off during the image display stage, and control the fifth switches to be switched on and the fourth switches to be switched off during the fingerprint sensing stage.

48. The driving circuit according to claim 39, wherein the first signal is a pulse signal having the same frequency and the same phase as the fingerprint sensing signal, or the first signal is a pulse signal having the same frequency, the same phase, and the same amplitude as the fingerprint sensing signal.

49. The driving circuit according to claim 39, wherein a sixth switch is provided between the common voltage generation circuit and the common electrode, and a seventh switch is provided between the fingerprint sensing detection circuit and the common electrode; and the driving circuit controls the sixth switch to be switched on and the seventh switch to be switched off during the image display stage, and controls the seventh switch to be switched on and the sixth switch to be switched off during the fingerprint sensing stage.

50. The driving circuit according to claim 39, wherein the fingerprint sensing detection circuit comprises a plurality of fingerprint sensing detection modules, each fingerprint sensing detection module is configured to perform the fingerprint sensing on one first sub-pixel unit or is configured to perform the fingerprint sensing on more than one first sub-pixel unit simultaneously, and the fingerprint sensing detection module is configured to output the fingerprint sensing signal and output the first signal;

the fingerprint sensing detection module comprises:

an operational amplifier;

a reference voltage source connected with a non-inverting input terminal of the operational amplifier and configured to provide a reference voltage;

a feedback capacitor having one plate connected to an inverting input terminal of the operational amplifier and the other terminal connected to an output terminal of the operational amplifier;

a first switch having one terminal connected to the first data line and the other terminal connected to a first voltage source for outputting a first voltage, wherein a first node is defined between the first switch and the first data line;

a second switch having one terminal connected to the first node and the other terminal connected to the inverting input terminal of the operational amplifier;

an eighth switch having one terminal connected to the common electrode and the other terminal connected to a second voltage source for outputting a second voltage, wherein a second node is defined between the eighth switch and the common electrode, and both the first voltage and the second voltage are smaller than or greater than the reference voltage;

a ninth switch having one terminal connected to the second node and the other terminal connected to the reference voltage source;

a third switch connected in parallel with the feedback capacitor; and a controller configured to output a third control signal and a fourth control signal in a time division mode, wherein the third control signal is configured to switch on the first switch, the eighth switch and the third switch and to switch off the second switch and the ninth switch, and the fourth control signal is configured to switch on the second switch and the ninth switch and to switch off the first switch, the eighth switch and the third switch.

51. The driving circuit according to claim 39, wherein:
the display device further comprises a touch-sensitive unit, the touch-sensitive unit being stacked on the display panel or being a part of the display panel;
the driving circuit further comprises a touch driving circuit configured to perform a touch detection on the touch-sensitive unit; and
the driving circuit is connected with the touch driving circuit, and is configured to control the image display, the touch detection, and the fingerprint sensing in a time division mode, to implement the image display stage, a touch detection stage and the fingerprint sensing stage respectively.

52. The driving circuit according to claim 51, wherein the common electrode serves as a self-capacitive electrode for the touch detection; and
the touch driving circuit is connected with the common electrode and is configured to provide a self-capacitive touch detection signal to the common electrode.

53. The driving circuit according to claim 52, wherein a sixth switch is provided between the common electrodes and the common voltage generation circuit, a seventh switch is provided between the fingerprint sensing detection circuit and the common electrodes, and a tenth switch is provided between the common electrodes and the touch driving circuit; and
the driving circuit is configured to control the sixth switch to be switched on and the seventh switch and the tenth switch to be switched off during the image display stage, control the tenth switch to be switched on and the sixth switch and the seventh switch to be switched off during the touch detection stage, and control the seventh switch to be switched on and the sixth switch and the tenth switch to be switched off during the fingerprint sensing stage.

54. The driving circuit according to claim 52, further comprising a second signal generation circuit connected with the first scanning lines and the second scanning lines and configured to provide a second signal,
wherein the driving circuit is configured to control the second signal generation circuit to provide the second signal to the first scanning lines and the second scanning lines during the touch detection, the control switches are controlled to be in a switched-off state due to the second signal, and electric quantities in charging and discharging capacitors formed by the common electrodes and the first scanning lines, and electric quantities in charging and discharging capacitors formed by the common electrodes and the second scanning lines are reduced due to the second signal.

55. The driving circuit according to claim 54, wherein the second signal is a pulse signal having the same frequency and the same phase as the touch detection signal, or the second signal is a pulse signal having the same frequency, the same phase, and the same amplitude as the touch detection signal.

56. The driving circuit according to claim 52, further comprising a third signal generation circuit connected with the first data lines and the second data lines and configured to provide a third signal,
wherein the driving circuit is configured to control the third signal generation circuit to provide the third signal to the first data lines and the second data lines during the touch detection, electric quantities in charging and discharging capacitors formed by the common electrodes and the first data lines and electric quantities in charging and discharging capacitors formed by the common electrodes and the second data lines are reduced due to the third signal.

57. The driving circuit according to claim 56, wherein the third signal is a pulse signal having the same frequency and the same phase as the touch detection signal, or the third signal is a pulse signal having the same frequency, the same phase, and the same amplitude as the touch detection signal.

58. The driving circuit according to claim 37, wherein the driving circuit is further configured to provide the display signals corresponding to fingerprint information to the display electrodes, to display a fingerprint image, after the driving circuit completes the fingerprint sensing or when the driving circuit performs the fingerprint sensing.

59. The driving circuit according to claim 37, wherein the driving circuit provides the fingerprint sensing signal to the first electrodes to perform the fingerprint sensing, and stops outputting the display signals to the first electrodes or disconnects from the first electrodes to stop outputting the display signals to the first electrodes, during the fingerprint sensing stage.

60. The driving circuit according to claim 59, wherein the driving circuit outputs the display signals to the first electrodes to perform the image display, and stops outputting the fingerprint sensing signal to the first electrodes or disconnects from the first electrodes to stop outputting the fingerprint sensing signal to the first electrodes, during the image display stage.

61. A method for driving a display device, wherein the display device comprises a display panel provided with a plurality of display electrodes, the display electrodes are configured to display images, the display electrodes located within a predetermined region of the display panel are defined as first electrodes, the first electrodes are configured to implement a fingerprint sensing, and a stage during which the first electrodes perform the fingerprint sensing is defined as a fingerprint sensing stage, wherein a stage during which the first electrodes perform image display is defined as an image display stage, the display panel is further provided with a common electrode, and the common electrode and each display electrode serve as two polar plates of one sub-pixel unit in the display panel; and
the method comprises:
providing display signals to the display electrodes to display the images, wherein the display signals are pixel voltages; and
providing a fingerprint sensing signal to the first electrodes and performing a self-capacitance detection on the first electrodes during the fingerprint sensing stage, to implement the fingerprint sensing, wherein the process of providing the display signals to the display electrodes to display the images comprises: providing a common voltage to the common electrode, wherein the two polar plates of each sub-pixel unit are applied with the common voltage and one of the pixel voltages respectively to display the images; and
the process of providing the fingerprint sensing signal to the first electrodes and performing the self-capacitance detection on the first electrodes during the fingerprint sensing stage, to implement the fingerprint sensing comprises: providing a first signal to the common electrode during the fingerprint sensing stage, for reducing electric quantities in charging and discharging capacitors formed by the first electrodes and the common electrode during the fingerprint sensing.

62. The method according to claim 61, wherein
the display panel is further provided with scanning lines arranged in rows, data lines arranged in columns, and control switches connected with the scanning lines and the data lines, each control switch comprises a control terminal, a first terminal, and a second terminal, the control terminal being configured to control whether a signal is transmittable between the first terminal and the second terminal, the control terminals of the control switches are connected with the scanning lines, the first terminals are connected with the data lines, and the second terminals are correspondingly connected with the display electrodes;
the process of providing display signals to the display electrodes to display the images comprises:
sending scanning driving signals to the scanning lines to switch on the control switches; and
sending the display signals to the data lines and transmitting the display signals to the display electrodes through the control switches that are switched on.

63. The method according to claim 62, wherein each sub-pixel unit comprises one display electrode and the control switch connected with the display electrode, sub-pixel units comprising the first electrodes are defined as first sub-pixel units and other sub-pixel units are defined as second sub-pixel units, the control switches in the first sub-pixel units are defined as first control switches, the control switches in the second sub-pixel units are defined as second control switches, the scanning lines connected with the first sub-pixel units are defined as first scanning lines, the scanning lines connected with the second sub-pixel units but not connected with the first sub-pixel units are defined as second scanning lines, the data lines conned with the first sub-pixel units are defined as first data lines, and the data lines connected with the second sub-pixel units but not connected with the first sub-pixel units are defined as second data lines;
the process of providing the fingerprint sensing signal to the first electrodes and performing the self-capacitance detection on the first electrodes during the fingerprint sensing stage, to implement the fingerprint sensing comprises:
providing a fingerprint sensing control signal to switch on the first control switches; and
providing the fingerprint sensing signal and transmitting the fingerprint sensing signal to the first electrodes through the first control switches that are switched on, to perform the fingerprint sensing.

64. The method according to claim 63, wherein the display electrodes of the second sub-pixel units are defined as second electrodes, and
the process of providing the fingerprint sensing signal to the first electrodes and performing the self-capacitance detection on the first electrodes during the fingerprint sensing stage, to implement the fingerprint sensing comprises:
controlling the second control switches connected with the second scanning lines to be switched off during the fingerprint sensing stage; and
sending the fingerprint sensing control signal to the first scanning lines to switch on the first control switches and sending the fingerprint sensing signal to the first data lines.

65. The method according to claim 64, wherein the display panel comprises a plurality of second sub-pixel units connected with the first scanning lines and the second data lines,
the second control switches of the second sub-pixel units connected with the first scanning lines are switched on when the fingerprint sensing control signal is sent to the first scanning lines; and
the method further comprises: sending the display signals to the second data lines and transmitting the display signals to the second electrodes of the second sub-pixel units connected with the first scanning lines.

66. The method according to claim 63, wherein the process of providing the fingerprint sensing signal to the first electrodes and performing the self-capacitance detection on the first electrodes during the fingerprint sensing stage, to implement the fingerprint sensing comprises: performing the fingerprint sensing on one first sub-pixel unit in the display panel, or performing the fingerprint sensing on more than one first sub-pixel unit in the display panel simultaneously.

67. The method according to claim 66, wherein the display panel comprises a plurality of the first sub-pixel units and a plurality of the second sub-pixel units, the first sub-pixel units comprise first red sub-pixel units, first green sub-pixel units and first blue sub-pixel units, and the second sub-pixel units comprise second red sub-pixel units, second green sub-pixel units and second blue sub-pixel units;
the display panel comprises first pixel units and second pixel units, the first pixel units are located within the predetermined region and are configured to implement the fingerprint sensing and image display, each first pixel unit comprises one first red sub-pixel unit, one first green sub-pixel unit and one first blue sub-pixel unit, and each second pixel unit comprises one second red sub-pixel unit, one second green sub-pixel unit and one second blue sub-pixel unit; and
the process of providing the fingerprint sensing signal to the first electrodes and performing the self-capacitance detection on the first electrodes during the fingerprint sensing stage, to implement the fingerprint sensing comprises: performing the fingerprint sensing on all sub-pixel units of one first pixel unit simultaneously.

68. The method according to claim 67, wherein the first control switches and the second control switches are polysilicon thin film transistors, the first control switches of the first red sub-pixel unit, the first green sub-pixel unit and the first blue sub-pixel unit in one first pixel unit are connected with different first scanning lines respectively and connected with an identical first data line; and
the process of providing the fingerprint sensing signal to the first electrodes and performing the self-capacitance detection on the first electrodes during the fingerprint sensing stage, to implement the fingerprint sensing comprises:
providing the fingerprint sensing control signal simultaneously to three first scanning lines respectively connected with the first red sub-pixel unit, the first green sub-pixel unit and the first blue sub-pixel unit in the one first pixel unit, to simultaneously switch on the first control switches of the first red sub-pixel unit, the first green sub-pixel unit and the first blue sub-pixel unit in the one first pixel unit; and providing the fingerprint sensing signal to the first red sub-pixel unit, the first green sub-pixel unit and the first blue sub-pixel unit in the one first pixel unit via the identical first data line.

69. The method according to claim 63, wherein the fingerprint sensing control signal is a pulse signal having the same frequency and the same phase as the fingerprint sensing signal, and is for switching on the first control switches during the fingerprint sensing and reducing electric quantities in charging and discharging capacitors formed by the first scanning lines and the first electrodes;
or the fingerprint sensing control signal is a pulse signal having the same frequency, the same phase and the same amplitude as the fingerprint sensing signal, and is for switching on the first control switches during the fingerprint sensing and reducing electric quantities in charging and discharging capacitors formed by the first scanning lines and the first electrodes.

70. The method according to claim 63, wherein:
the display device further comprises a touch-sensitive unit, the touch-sensitive unit being stacked on the display panel or being a part of the display panel; and
the method further comprises:
performing a touch detection on the touch-sensitive unit, and
driving the image display stage, a touch detection stage and the fingerprint sensing stage in a time division mode.

71. The method according to claim 70, wherein the common electrode serves as a self-capacitive electrode for the touch detection,
wherein the process of performing a touch detection on the touch-sensitive unit comprises: providing a self-capacitive touch detection signal to the common electrode.

72. The method according to claim 71, wherein the process of providing a self-capacitive touch detection signal to the common electrodes comprises: providing a second signal to the first scanning lines and the second scanning lines during the touch detection, wherein the control switches are controlled to be in a switched-off state due to the second signal, and electric quantities in charging and discharging capacitors formed by the common electrodes and the first scanning lines, and electric quantities in charging and discharging capacitors formed by the common electrodes and the second scanning lines are reduced.

73. The method according to claim 72, wherein the second signal is a pulse signal having the same frequency and the same phase as the touch detection signal, or the second signal is a pulse signal having the same frequency, the same phase, and the same amplitude as the touch detection signal.

74. The method according to claim 71, wherein the process of providing a self-capacitive touch detection signal to the common electrodes comprises: providing a third signal to the first data lines and the second data lines, wherein electric quantities in charging and discharging capacitors formed by the common electrodes and the first data lines and electric quantities in charging and discharging capacitors formed by the common electrodes and the second data lines are reduced due to the third signal.

75. The method according to claim 74, wherein the third signal is a pulse signal having the same frequency and the same phase as the touch detection signal, or the third signal is a pulse signal having the same frequency, the same phase, and the same amplitude as the touch detection signal.

76. The method according to claim 61, wherein the first signal is a pulse signal having the same frequency and the same phase as the fingerprint sensing signal, or the first signal is a pulse signal having the same frequency, the same phase, and the same amplitude as the fingerprint sensing signal.

77. The method according to claim 61, further comprising: providing the display signals corresponding to fingerprint information to the display electrodes to display a fingerprint image, after a completion of the fingerprint sensing or when performing the fingerprint sensing.

78. A display device, comprising:
a display panel comprising a plurality of pixel units and a plurality of data lines connected with the pixel units, wherein each pixel unit comprises one display electrode, the display electrodes are configured to display images, the pixel units located within a predetermined region of the display panel are defined as first pixel units, the display electrodes of the first pixel units are defined as first electrodes, and the first electrodes are configured to implement a fingerprint sensing, wherein a stage during which the first electrodes perform image display is define as an image display stage, the display panel is further provided with a common electrode, and the common electrode and each display electrode serve as two polar plates of one sub-pixel unit in the display panel; and
a data line driving circuit connected with the pixel units via the data lines, wherein the data line driving circuit is configured to provide display signals to the display electrodes of the pixel units via the data lines to display the images, wherein the display signals are pixel voltages;
wherein the display panel further comprises transmission lines, and the display device further comprises:
a fingerprint sensing detection circuit connected with the first pixel units via the transmission lines, the fingerprint sensing detection circuit being configured to provide a fingerprint sensing signal to the first electrodes of the first pixel units via the transmission lines and implement a fingerprint sensing by detecting self-capacitances of the first electrodes;
wherein the display device further comprises a common voltage generation circuit connected with the common electrode and configured to provide a common voltage to the common electrode, wherein the two polar plates of each sub-pixel unit are applied with the common voltage and one of the pixel voltages respectively, to display the images; and
a first signal generation circuit connected with the common electrode and configured to provide a first signal, wherein the display device is further configured to;
control the first electrodes to perform the fingerprint sensing or image display; and
control the common voltage generation circuit to provide the common voltage to the common electrode during the image display stage; and control the first signal generation circuit to provide the first signal to the common electrode during the fingerprint sensing stage, for reducing electric quantities in charging and discharging capacitors formed by the first electrodes and the common electrode during the fingerprint sensing.

79. The display device according to claim 78, further comprising first switches and second switches, wherein each data line is connected with the data line driving circuit via one first switch, each transmission line is connected with the fingerprint sensing detection circuit via one second switch, a stage during which the first electrodes perform the fingerprint sensing is defined as a fingerprint sensing stage, the display device controls the first switches to be switched off and the second switches to be switched on during the fingerprint sensing stage, and the display device controls the first switches to be switched on and the second switches to be switched off during the image display stage.

* * * * *